United States Patent
Takahashi

(10) Patent No.: US 11,407,314 B2
(45) Date of Patent: Aug. 9, 2022

(54) BRAKE SYSTEM

(71) Applicant: TOYOTA JIDOSHA KABUSHIKI KAISHA, Toyota (JP)

(72) Inventor: Yu Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 16/827,013

(22) Filed: Mar. 23, 2020

(65) Prior Publication Data
US 2020/0307386 A1  Oct. 1, 2020

(30) Foreign Application Priority Data

Mar. 28, 2019 (JP) .............................. JP2019-064058

(51) Int. Cl.
*B60L 7/26* (2006.01)
*B60T 13/58* (2006.01)
(Continued)

(52) U.S. Cl.
CPC .................. *B60L 7/26* (2013.01); *B60T 8/17* (2013.01); *B60T 13/586* (2013.01);
(Continued)

(58) Field of Classification Search
CPC . B60L 7/26; B60L 15/2009; B60W 30/18127; B60T 8/26; B60T 8/267; B60T 13/586; B60T 2270/604; B60T 2270/608
See application file for complete search history.

(56) References Cited

U.S. PATENT DOCUMENTS 5,318,355 A * 6/1994 Asanuma .............. B60T 8/4081
  477/203
5,378,053 A * 1/1995 Patient ...................... B60L 7/12
  303/3

(Continued)

FOREIGN PATENT DOCUMENTS

JP    2002-506339 A    2/2002
JP    2006-123889 A    5/2006
(Continued)

OTHER PUBLICATIONS

EPO machine translation of WO 2005/110827 (original WO document published Nov. 24, 2005) (Year: 2005).*

*Primary Examiner* — David A Testardi
(74) *Attorney, Agent, or Firm* — Sughrue Mion, PLLC

(57) ABSTRACT

A brake system includes: a friction brake mechanism; a regenerative brake mechanism; and an electronic control unit. The electronic control unit is configured to obtain a target regenerative braking force. The electronic control unit is configured to perform replacement control between the friction brake mechanism and the regenerative brake mechanism when a predetermined replacement condition is satisfied. The replacement control is control in which a shortfall of the required total braking force, which is caused by a decrease in the regenerative braking force, is covered by increasing the front wheel friction braking force and the rear wheel friction braking force while satisfying a set relationship between the front wheel friction braking force and the rear wheel friction braking force or between an increase gradient of the front wheel friction braking force and an increase gradient of the rear wheel friction braking force.

9 Claims, 17 Drawing Sheets

(51) Int. Cl.
  *B60T 8/17* (2006.01)
  *B60W 30/18* (2012.01)
(52) U.S. Cl.
  CPC .. *B60W 30/18127* (2013.01); *B60T 2270/604* (2013.01); *B60T 2270/608* (2013.01)

(56) References Cited

U.S. PATENT DOCUMENTS

| | | | | |
|---|---|---|---|---|
| 5,433,512 | A * | 7/1995 | Aoki | B60T 8/267 303/3 |
| 6,457,784 | B1 * | 10/2002 | Bohm | B60L 7/26 303/155 |
| 2002/0030408 | A1 * | 3/2002 | Niwa | B60T 8/267 303/152 |
| 2002/0036429 | A1 * | 3/2002 | Shimada | B60K 6/52 303/152 |
| 2002/0180266 | A1 * | 12/2002 | Hara | B60L 7/12 303/152 |
| 2003/0173826 | A1 * | 9/2003 | Tazoe | B60W 10/08 903/947 |
| 2004/0108771 | A1 * | 6/2004 | Tsunehara | B60L 7/26 303/155 |
| 2006/0066146 | A1 | 3/2006 | Otomo | |
| 2007/0018499 | A1 * | 1/2007 | Kokubo | B60L 7/14 303/151 |
| 2007/0228821 | A1 * | 10/2007 | Maki | B60L 7/10 303/151 |
| 2008/0100129 | A1 * | 5/2008 | Lubbers | B60L 7/18 303/113.1 |
| 2008/0228367 | A1 * | 9/2008 | Aoki | B60T 8/4827 701/70 |
| 2010/0244547 | A1 * | 9/2010 | Gilles | B60L 7/26 303/3 |
| 2010/0276240 | A1 * | 11/2010 | Wuerth | B60T 8/267 188/358 |
| 2012/0074767 | A1 * | 3/2012 | Nishio | B60L 50/16 303/3 |
| 2012/0319465 | A1 * | 12/2012 | Koyama | B60L 1/10 303/3 |
| 2013/0002008 | A1 * | 1/2013 | Matsuoka | B60T 13/146 303/3 |
| 2013/0297165 | A1 * | 11/2013 | Crombez | B60L 1/10 701/70 |
| 2013/0297170 | A1 * | 11/2013 | Kunz | B60L 7/18 701/70 |
| 2014/0084673 | A1 * | 3/2014 | Matsuoka | B60T 8/4872 303/3 |
| 2014/0095046 | A1 * | 4/2014 | Nishio | B60T 13/686 701/81 |
| 2014/0163833 | A1 * | 6/2014 | Kim | B60L 7/26 701/70 |
| 2015/0353064 | A1 * | 12/2015 | Spoeri | B60T 13/586 303/3 |
| 2016/0280191 | A1 * | 9/2016 | Okano | B60T 8/17 |
| 2018/0141528 | A1 * | 5/2018 | Oh | B60W 30/18127 |
| 2020/0189398 | A1 * | 6/2020 | Suzuki | B60W 10/08 |

FOREIGN PATENT DOCUMENTS

| | | | | |
|---|---|---|---|---|
| JP | | 2008056151 A | * | 3/2008 |
| JP | | 2009278840 A | * | 11/2009 |
| JP | | 2014-196033 A | | 10/2014 |
| JP | | 2016111891 A | * | 6/2016 |
| WO | WO-2005110827 A1 | * | 11/2005 | ............... B60T 8/00 |

* cited by examiner

BRAKE SYSTEM

INCORPORATION BY REFERENCE

The disclosure of Japanese Patent Application No. 2019-064058 filed on Mar. 28, 2019 including the specification, drawings and abstract is incorporated herein by reference in its entirety.

BACKGROUND

1. Technical Field

The disclosure relates to a brake system.

2. Description of Related Art

Japanese Unexamined Patent Application Publication No. 2006-123889 (JP 2006-123889 A) describes a hydraulic brake device including a regenerative brake device and a regenerative braking force control device. The regenerative brake device applies a regenerative braking force to a drive wheel out of a plurality of wheels by regenerative braking of an electric motor connected to the drive wheel. The regenerative braking force control device controls the regenerative braking force. The hydraulic brake device further includes a communication device and a regenerative cooperative control device. The communication device receives information on an actual regenerative braking force from the regenerative brake force control device. Based on the actual regenerative braking force indicated by the information received by the communication device, the regenerative cooperative control device controls the hydraulic pressure of a brake cylinder so that the total braking force including a regenerative braking force and a hydraulic braking force which are applied to the drive wheel becomes equal to a required braking force that is determined according to the operation state of a brake operation member. A hydraulic pressure source communication control device includes a booster/power hydraulic pressure source communication unit. In case of any abnormality of the regenerative brake force control device, the booster/power hydraulic pressure source communication unit shuts off at least a master cylinder from a hub portion to allow at least one of a hydraulic booster and a power hydraulic pressure source to communicate with the hub portion. In this brake system, when a regenerative braking force being applied to the vehicle is replaced with a hydraulic braking force with no regenerative braking force applied to the vehicle, the regenerative braking force is reduced stepwise or gradually, and the hydraulic braking force is increased stepwise or gradually. Such replacement control is called transition control.

SUMMARY

The disclosure reduces a change in attitude of a vehicle while restraining reduction in energy efficiency during replacement control.

A brake system according to an aspect of the disclosure includes: a friction brake mechanism; a regenerative brake mechanism; and an electronic control unit. The friction brake mechanism includes (a) a front wheel friction brake that is a friction brake provided for a front wheel of a vehicle, (b) a rear wheel friction brake that is a friction brake provided for a rear wheel of the vehicle, (c) a front wheel friction braking force control device configured to control a front wheel friction braking force applied to the front wheel by the front wheel friction brake, and (d) a rear wheel friction braking force control device configured to control a rear wheel friction braking force applied to the rear wheel by the rear wheel friction brake. The regenerative brake mechanism is configured to apply a regenerative braking force to a drive wheel of the vehicle by regenerative braking of an electric motor that drives and rotates the drive wheel, and is configured to control the regenerative braking force. The electronic control unit is configured to obtain, as a target regenerative braking force, a maximum regenerative braking force that can be output within a range that is not larger than a required total braking force, and control the regenerative brake mechanism based on the target regenerative braking force to control the regenerative braking force applied to the drive wheel, the required total braking force being a braking force required for the vehicle, and the maximum regenerative braking force being determined by a state of the vehicle. The electronic control unit is configured to control the front wheel friction braking force control device and the rear wheel friction braking force control device such that the required total braking force, which is the braking force required for the vehicle, is satisfied by one or more of the regenerative braking force, the front wheel friction braking force, and the rear wheel friction braking force. The electronic control unit is configured to perform replacement control when a predetermined replacement condition is satisfied. The replacement control is control in which a shortfall of the required total braking force, which is caused by a decrease in the regenerative braking force, is covered by increasing the front wheel friction braking force and the rear wheel friction braking force while satisfying a set relationship between the front wheel friction braking force and the rear wheel friction braking force or between an increase gradient of the front wheel friction braking force and an increase gradient of the rear wheel friction braking force, whereby a state in which the regenerative braking force being applied to the vehicle is replaced with a state in which the front wheel friction braking force and the rear wheel friction braking force are applied to the vehicle with no regenerative braking force applied to the vehicle.

In the replacement control of the brake system, the regenerative braking force is set to the maximum value that can be output within the range that is not larger than the required total braking force, and this maximum value is determined based on the state of the vehicle. This restrains reduction in energy efficiency during the replacement control. In the replacement control, the shortfall of the required total braking force which is caused when this maximum regenerative braking force is output is covered by increasing the front wheel friction braking force and the rear wheel friction braking force. This restrains a change in attitude of the vehicle during the replacement control as compared to the case where the shortfall of the required total braking force is covered by increasing the friction braking force applied to a non-drive wheel out of the front and rear wheels. JP 2006-123889 A neither describes that, in the replacement control, the regenerative braking force is set to the maximum value that can be output within the range that is not larger than the required total braking force nor describes that, in the replacement control, the shortfall of the required total braking force which is caused when the maximum regenerative braking force is output is covered by increasing the front wheel friction braking force and the rear wheel friction braking force.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A brake system according to an embodiment will be described with reference to the accompanying drawings.

First Embodiment

Figure 1:
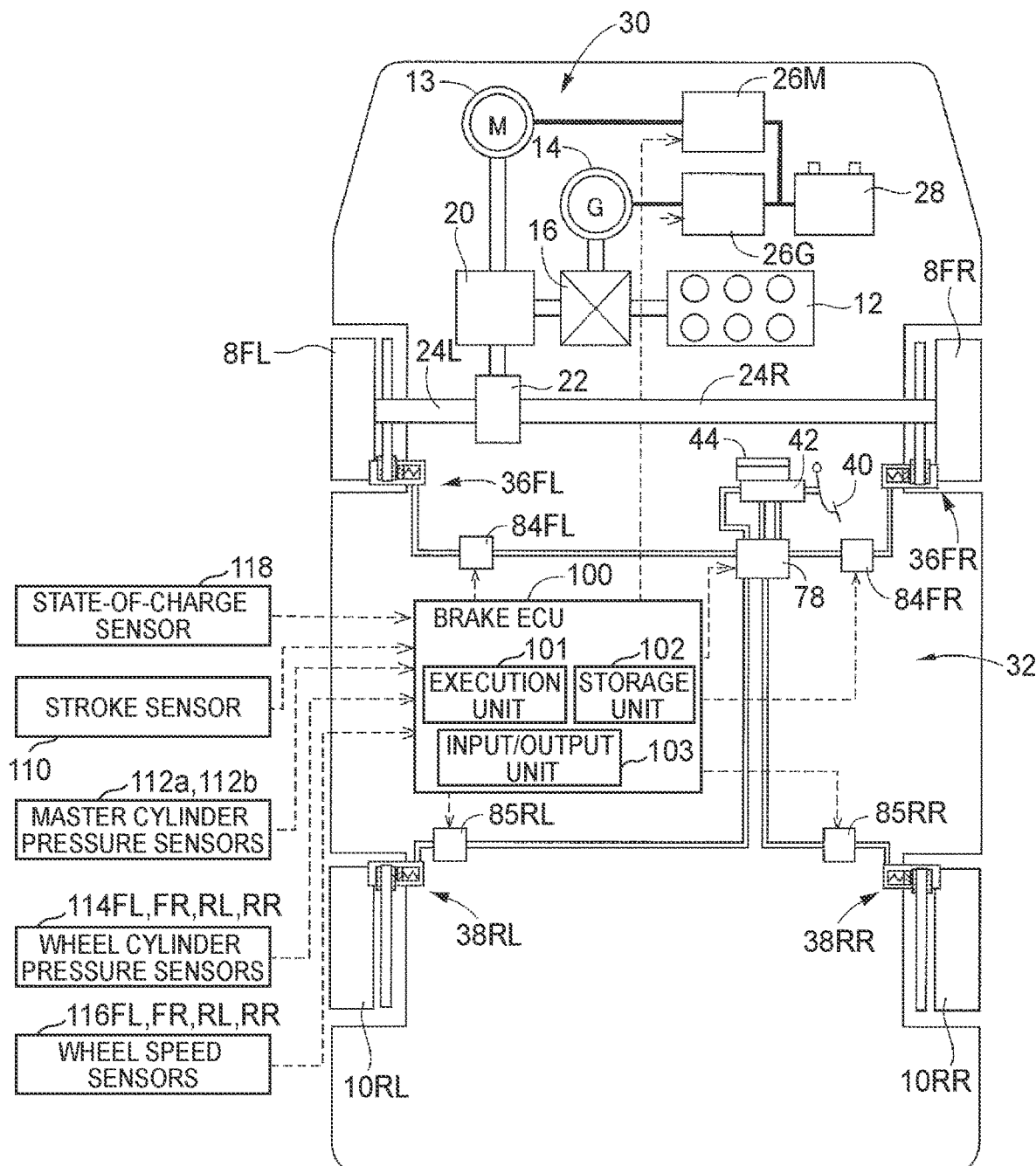
FIG. 1 is a diagram conceptually illustrating a vehicle including a brake system according to a first embodiment.

FIG. 1 schematically illustrates an example of a vehicle equipped with a brake system according to the present embodiment. The vehicle is a hybrid vehicle including right and left front wheels 8FR, 8FL and right and left rear wheels 10RR, 10RL, and the right and left front wheels 8FR, 8FL are drive wheels. A drive system of the vehicle includes an engine 12, an electric motor 13, a generator 14, a power split device 16, etc. The engine 12 and the electric motor 13 are driving sources, and the generator 14 mainly functions as an electric generator.

The power split device 16 splits rotation of the engine 12 into rotation of the generator 14 and rotation of an output shaft of the power split device 16. A reduction mechanism 20 that functions as a speed reducer is provided on the output shaft of the power split device 16. The electric motor 13 is connected to the reduction mechanism 20, and an output shaft of the reduction mechanism 20 is connected to the right and left front wheels 8FR, 8FL via a differential unit 22 and drive shafts 24R, 24L. The right and left front wheels 8FR, 8FL are driven to rotate by at least one of the engine 12 and the electric motor 13. The generator 14 and the electric motor 13 are connected to a battery 28 via inverters 26G, 26M, respectively. The battery 28 supplies electrical energy to the electric motor 13 etc. and stores electrical energy produced by the electric motor 13 and the generator 14. The operations of the generator 14 and the electric motor 13 are controlled by control of the inverters 26G, 26M, respectively.

The brake system according to the present embodiment includes (a) a regenerative brake mechanism 30 that applies a regenerative braking force to each of the right and left front wheels 8FR, 8FL that are drive wheels and (b) a hydraulic brake mechanism 32 that applies a hydraulic braking force as a friction braking force to each of the four wheels, namely the right and left front wheels 8FR, 8FL and the right and left rear wheels 10RR, 10RL.

The regenerative brake mechanism 30 includes the electric motor 13, the inverter 26M, the battery 28, etc. The regenerative brake mechanism 30 can apply a regenerative braking force to the right and left front wheels 8FR, 8FL by regenerative braking of the electric motor 13 and can control the regenerative braking force. The electrical energy generated by regenerative braking of the electric motor 13 is supplied to the battery 28 via the inverter 26M and stored in the battery 28. The electric motor 13 is controlled by control of the inverter 26M to control the regenerative braking force that is applied to the right and left front wheels 8FR, 8FL.

Figure 2:
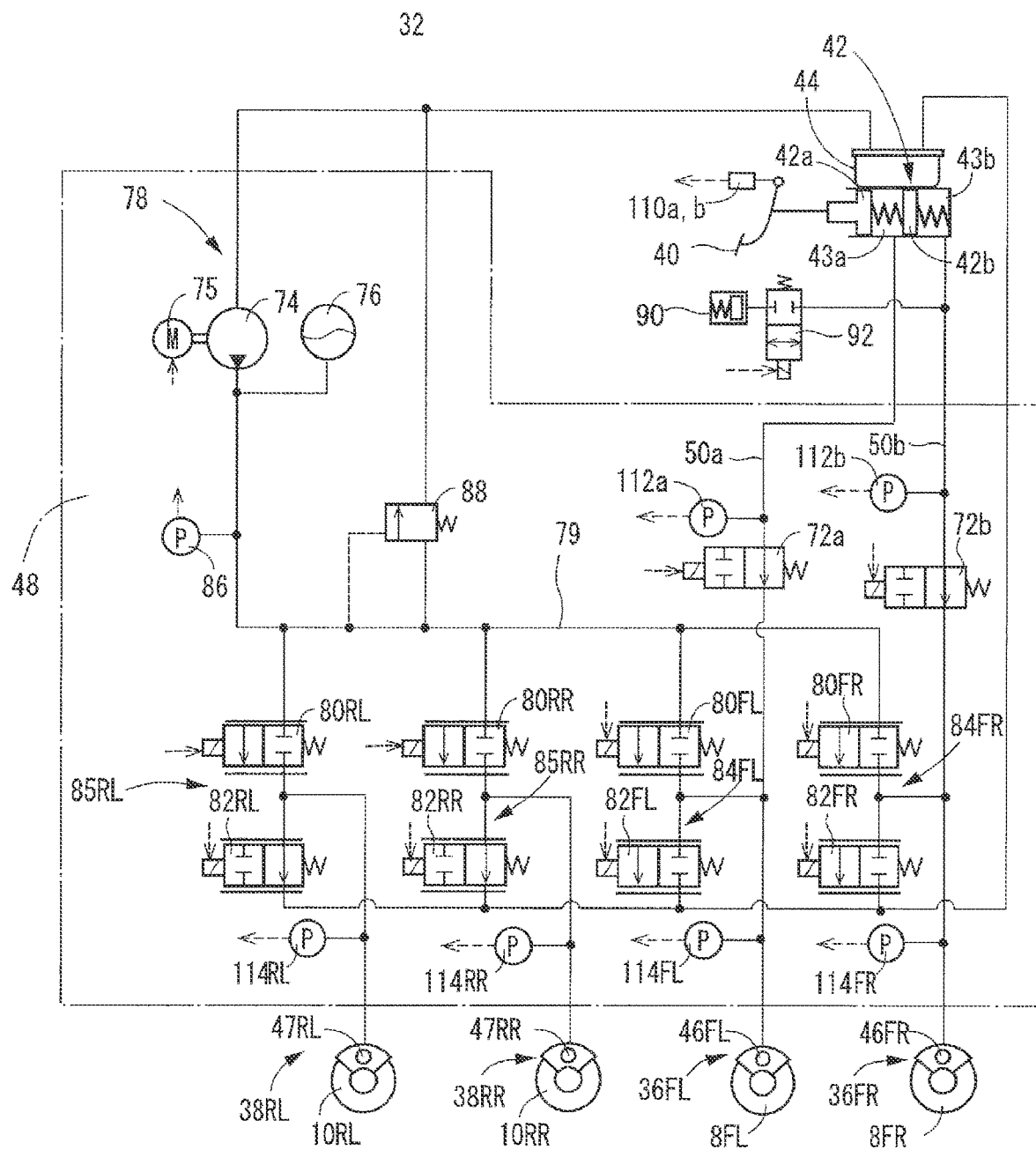
FIG. 2 is a hydraulic circuit diagram of a hydraulic brake mechanism included in the brake system.

As shown in FIG. 2, the hydraulic brake mechanism 32 includes (a) hydraulic brakes 36FR, 36FL that are friction brakes provided on the right and left front wheels 8FR, 8FL, respectively, (b) hydraulic brakes 38RR, 38RL provided on the right and left rear wheels 10RR, 10RL, respectively, (c) a master cylinder 42 that operates with a brake pedal 40 that is a brake operation member to be operated by the driver, (d) a hydraulic control unit 48 disposed between the master cylinder 42 and a reservoir 44 and wheel cylinders 46FR, 46FL, 47RR, 47RL of the hydraulic brakes 36FR, 36FL, 38RR, 38RL, etc.

The master cylinder 42 is a tandem cylinder including two pressurizing pistons 42*a*, 42*b* slidably fitted in a housing in a fluid-tight manner and two pressurizing chambers 43*a*, 43*b* provided in front of the two pressurizing pistons 42*a*, 42*b*, respectively. A brake pedal 40 operates with the rear pressurizing piston 42*a* of the two pressurizing pistons 42*a*, 42*b*. A hydraulic pressure corresponding to a brake operation force is generated in each of the two pressurizing chambers 43*a*, 43*b*. The brake operation force is the operation force applied to the brake pedal 40 by the driver.

Master passages 50*a*, 50*b* are connected to the pressurizing chambers 43*a*, 43*b*, respectively. The pressurizing chambers 43*a*, 43*b* are connected to the wheel cylinders 46FL, 46FR via the master passages 50*a*, 50*b*, respectively. Regarding the hydraulic brakes 36FR, 36FL, 38RR, 38RL etc. corresponding to the right and left front wheels 8FR, 8FL and the right and left rear wheels 10RR, 10RL, the letters FR, FL, RR, RL will be omitted from their reference characters when it is not necessary to distinguish among the right front wheel, the left front wheel, the right rear wheel, and the left rear wheel, and when generally referring to these components.

Figure 3:
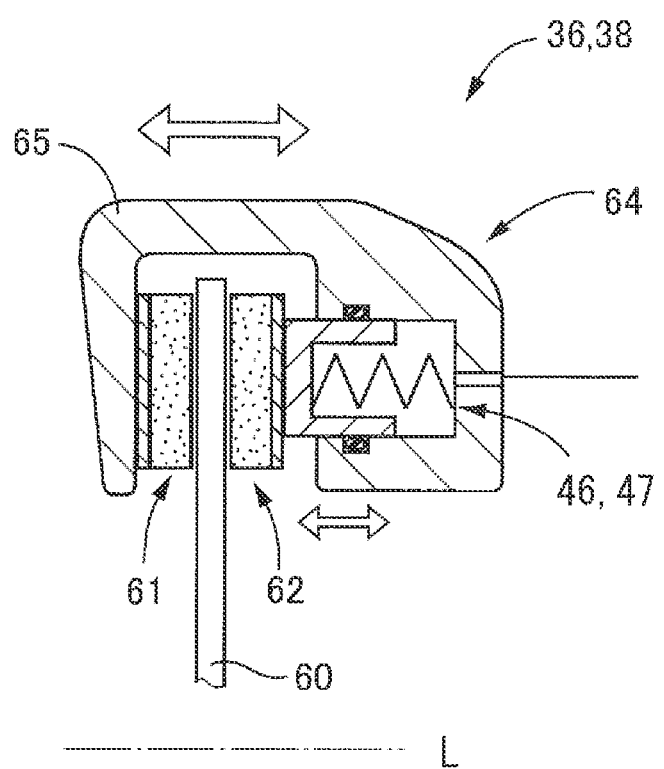
FIG. 3 is a sectional view of a disc brake included in the hydraulic brake mechanism.

The hydraulic brakes 36, 38 are disc brakes having the same structure. As shown in FIG. 3, each of the hydraulic brakes 36, 38 includes a brake rotary body 60, a pair of friction engagement members 61, 62, and a pressing device 64. The brake rotary body 60 is a rotary body that rotates with the wheel 8, 10. The pair of friction engagement members 61, 62 is located on both sides of the brake rotary body 60. The pressing device 64 presses the friction engagement members 61, 62 against the brake rotary body 60. The pressing device 64 includes a caliper 65 and the wheel cylinder 46, 47. The caliper 65 is moved by the hydraulic pressure of the wheel cylinder 46, 47, and the pair of friction engagement members 61, 62 are pressed against the brake rotary body 60. The hydraulic brakes 36, 38 are operated to reduce rotation of the wheels 8, 10, and the hydraulic braking force that is an example of the friction braking force is applied to the wheels 8, 10.

The hydraulic control unit 48 includes (1) master shut-off valves 72*a*, 72*b* that are normally open solenoid on-off valves mounted in the master passages 50*a*, 50*b*, respectively, (2) a power hydraulic pressure source 78 including a pump 74, a pump motor 75 that drives the pump 74, and an accumulator 76, (3) a common passage 79 to which the power hydraulic pressure source 78 and the wheel cylinders 46, 47 are connected, (4) pressure-increasing linear valves 80 that are solenoid valves mounted between the common passage 79 and the wheel cylinders 46, 47, (5) pressure-reducing linear valves 82 that are solenoid valves mounted between the reservoir 44 and the wheel cylinders 46, 47, etc. The pressure-increasing linear valves 80 are normally closed valves. The pressure-reducing linear valves 82 mounted between the reservoir 44 and the wheel cylinders 46 are normally closed valves, and the pressure-reducing linear valves 82 mounted between the reservoir 44 and the wheel cylinders 47 are normally open valves. Each solenoid valve device 84 is composed of the pressure-increasing linear valve 80 and the normally closed pressure-reducing linear valve 82 which are provided for the wheel cylinder 46 of the front wheel 8. Each solenoid valve device 85 is composed of the pressure-increasing linear valve 80 and the normally open pressure-reducing linear valve 82 which are provided for the wheel cylinder 47 of the rear wheel 10.

In the power hydraulic pressure source 78, the pump motor 75 is controlled so that an accumulator pressure detected by an accumulator hydraulic pressure sensor 86 is kept in a set range. The accumulator pressure is the pressure of hydraulic fluid stored in the accumulator 76. A relief valve 88 is mounted between the common passage 79 and the reservoir 44. The relief valve 88 controls the hydraulic pressure in the common passage 79 so that it does not become too high.

In the hydraulic control unit 48, the hydraulic pressures of the wheel cylinders 46, 47 are individually controlled by individual control of the solenoid valve devices 84, 85 using the hydraulic pressure of the power hydraulic pressure source 78 with the master shut-off valves 72*a*, 72*b* closed. The friction braking forces that are the hydraulic braking forces applied to the right and left front wheels 8 and the right and left rear wheels 10 are thus individually controlled. The friction braking force that is applied to each wheel 8, 10 has a magnitude corresponding to the hydraulic pressure of a corresponding one of the wheel cylinders 46, 47. That is, a front wheel friction braking force Ffr, which is the sum of the friction braking forces applied to the right and left front wheels 8, is controlled by control of the solenoid valve devices 84. A rear wheel friction braking force Frr, which is the sum of the friction braking forces applied to the right and left rear wheels 10, is controlled by control of the solenoid valve devices 85.

A stroke simulator 90 is connected to a part of the master passage 50*b* which is located upstream of the master shut-off valve 72*b* via a simulator control valve 92. The simulator control valve 92 is a solenoid valve.

As shown in FIG. 1, the brake system includes a brake electronic control unit (ECU) 100 mainly composed of a computer. The brake ECU 100 controls the regenerative brake mechanism 30 and the hydraulic brake mechanism 32 and includes an execution unit 101, a storage unit 102, an input/output unit 103, etc. A stroke sensor 110, master cylinder pressure sensors 112*a*, 112*b*, wheel cylinder pressure sensors 114, wheel speed sensors 116, a state-of-charge sensor 118, etc. are connected to the input/output unit 103 of the brake ECU 100. The inverters 26G, 26M etc. of the regenerative brake mechanism 30, the master shut-off valves 72*a*, 72*b* of the hydraulic brake mechanism 32, solenoids of the solenoid valve devices 84, 85, etc. are also connected to the brake ECU 100.

The stroke sensor 110 detects strokes of the brake pedal 40 made by the driver. The master cylinder pressure sensors 112*a*, 112*b* detect the hydraulic pressures in the pressurizing chambers 43*a*, 43*b* of the master cylinder 42, respectively. The operation state of the brake pedal 40 by the driver is obtained based on either or both of the output value of the stroke sensor 110 and the output values of the master cylinder pressure sensors 112*a*, 112*b*, and the braking force intended by the driver is obtained. The braking force intended by the driver is an example of the required total braking force that is the braking force required for the vehicle. Although not shown in the figures, the required total braking force may be obtained based on the relative positional relationship between the vehicle and an object ahead of the vehicle detected by a front monitoring device including a camera etc., may be obtained based on the slip state of the wheels 8, 10, etc.

The wheel cylinder pressure sensors 114 are provided for the wheel cylinders 46FR, 46FL, 47RR, 47RL and individually detect the hydraulic pressures of the wheel cylinders 46, 47. The friction braking forces applied to the wheels 8, 10 are individually obtained based on the hydraulic pressures of the wheel cylinders 46, 47 detected by the wheel cylinder pressure sensors 114. An actual front wheel friction braking force Ffr, which is the sum of actual friction braking forces applied to the right and left front wheels 8FR, 8FL, is obtained based on the hydraulic pressures of the wheel cylinders 46 detected by the wheel cylinder pressure sensors 114. An actual rear wheel friction braking force Frr, which is the sum of actual friction braking forces applied to the right and left rear wheels 10RR, 10RL, is obtained based on the hydraulic pressures of the wheel cylinders 47 detected by the wheel cylinder pressure sensors 114.

The wheel speed sensors 116 are provided for the right and left front wheels 8FR, 8FL and the right and left front wheels 10RR, 10RL and individually detect the rotational speeds of the wheels 8, 10. The traveling speed of the vehicle is obtained based on the rotational speeds of the wheels 8, 10. The state-of-charge sensor 118 detects the state of charge of the battery 28, namely the amount of electrical energy actually stored in the battery 28.

In the brake system configured as described above, when the brake pedal 40 is depressed and, for example, it is determined based on the information of the front monitoring device etc. that a braking force needs to be applied to the vehicle, a brake operation request is made and a required total braking force Fs is obtained. In the brake ECU 100, a maximum regenerative braking force that can be output is obtained within the range that is not larger than the required total braking force Fs, based on the amount of electrical energy stored in the battery 28 as detected by the state-of-charge sensor 118, the traveling speed of the vehicle obtained based on the detection values of the wheel speed sensors 116 (which corresponds to the rotational speed of the electric motor 13 etc.), etc. This maximum regenerative braking force that can be output is set as a target regenerative braking force Fe*. The target regenerative braking force Fe* is typically larger when the traveling speed is high than when it is low. The target regenerative braking force Fe* can be set to a larger value when the amount of electrical energy stored in the battery 28 is small than when it is large. However, the target regenerative braking force Fe* may be limited by the temperature of the battery 28, the characteristics of the battery 28, etc. An actual regenerative braking force Fe, which is an actual regenerative braking force output to the right front wheel 8FR and the left front wheel 8FL, is controlled by control of the inverter 26M of the regenerative brake mechanism 30 etc. so that the actual regenerative braking force Fe becomes closer to the target regenerative braking force Fe*. The actual regenerative braking force Fe can be obtained based on an actual current flowing through the electric motor 13 etc.

Next, a target front wheel friction braking force Ffrt and a target rear wheel friction braking force Frrt are obtained based on the required total braking force Fs minus the actual regenerative braking force Fe. The target front wheel friction braking force Ffrt is a target value of the front wheel friction braking force that is applied to the front wheels 8, and the target rear wheel friction braking force Frrt is a target value of the rear wheel friction braking force that is applied to the rear wheels 10. Based on the detection values of the wheel cylinder pressure sensors 114, the solenoid valve devices 84, 85 of the hydraulic brake mechanism 32 etc. are controlled so that the actual front wheel friction braking force Ffr and the actual rear wheel friction braking force Frr become closer to the target front wheel friction braking force Ffrt and the target rear wheel friction braking force Frrt. Control that is performed so as to satisfy the required total braking force Fs by one or more of the regenerative braking force Fe, the front wheel friction braking force Ffr, and the rear wheel friction braking force Frr is called regenerative cooperative control. In the regenerative cooperative control, one or more of the regenerative braking force Fe, the front wheel friction braking force Ffr, and the rear wheel friction braking force Frr may be 0.

Replacement control described later is also a part of the regenerative cooperative control. In other words, in the present embodiment, it can be considered that the regeneration cooperative control includes replacement control and normal regenerative cooperative control that is not the replacement control. The normal regenerative cooperative control refers to the regenerative cooperative control that is performed when the replacement control is not performed.

For example, when the traveling speed of the vehicle decreases and the rotational speed of the electric motor 13 also decreases during the normal regenerative cooperative control, the maximum regenerative braking force that can be output also decreases, and it becomes difficult to output a large regenerative braking force. When the rotational speed of the electric motor 13 decreases, it becomes difficult to efficiently store electrical energy in the battery 28 by control of the inverter 26M. Accordingly, when the traveling speed of the vehicle is equal to or lower than a speed threshold value that is a set speed, namely when replacement conditions are satisfied etc., the replacement control is performed. In the replacement control, a state in which the regenerative braking force Fe is applied to the vehicle is replaced with a state in which the front wheel friction braking force Ffr and the rear wheel friction braking force Frr are applied to the vehicle with no regenerative braking force Fe applied to the vehicle. For example, the speed threshold value may be a speed at which it is difficult to output the regenerative braking force Fe equal to or larger than a set value due to the low rotational speed of the electric motor 13, and it is difficult to efficiently store electrical energy in the battery 28 by control of the inverter 26M. The replacement control is performed as long as the replacement conditions are satisfied, that is, as long as the traveling speed of the vehicle is equal to or lower than the speed threshold value and the regenerative braking force Fe is larger than 0.

In the brake system of the related art, the replacement control is performed as follows. With a decrease in regenerative braking force Fe, the rear wheel friction braking force Frr is increased with the front wheel friction braking force Ffr being maintained, and then the front wheel friction braking force Ffr is increased. That is, when the required total braking force Fs is constant, the regenerative braking force Fe is decreased with a decrease in traveling speed of the vehicle, and a shortfall of the required total braking force Fs due to the decrease in regenerative braking force Fe is covered by the rear wheel friction braking force Frr. When the rear wheel friction braking force Frr reaches the target rear wheel friction braking force Frrt determined by an actual braking force distribution ratio and the required total braking force Fs, the front wheel friction braking force Ffr is increased with a decrease in regenerative braking force Fe.

Figure 17A:
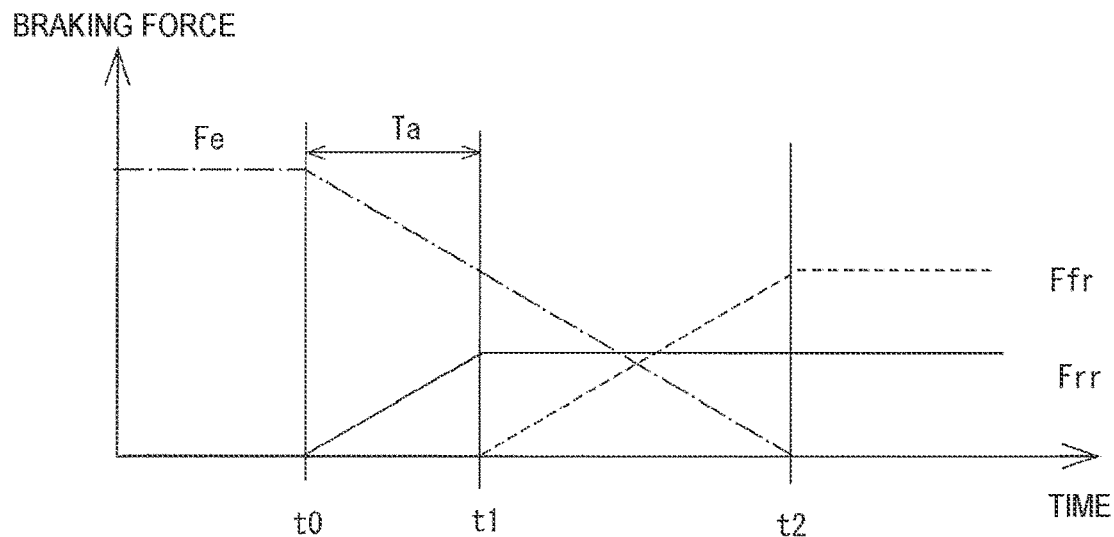
FIG. 17A is a graph illustrating an example of how a braking force changes in a brake system of the related art.
Figure 17B:
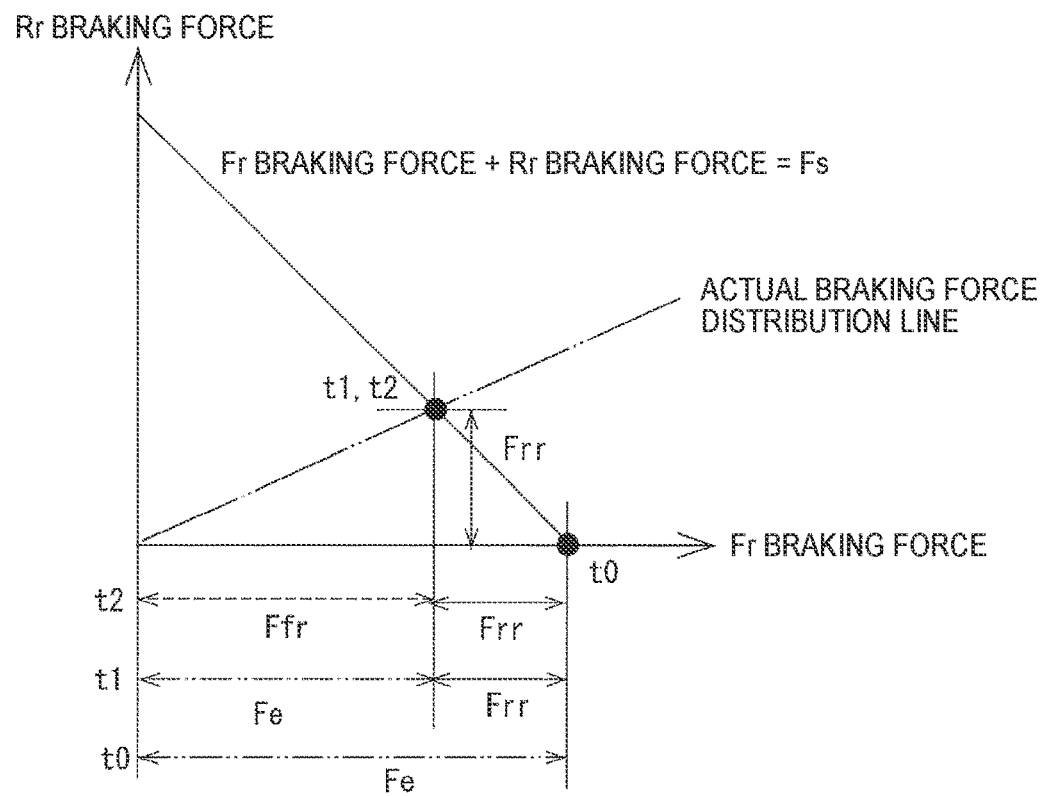
FIG. 17B is a graph illustrating the example of how the braking force changes in the brake system of the related art.

For example, in the case of FIGS. 17A and 17B, a rear wheel braking force is 0 at time t0 because no friction braking force is being applied to the rear wheels 10 at time t0. However, a front wheel braking force is relatively large at time t0 because the regenerative braking force Fe is being applied to the right and left front wheels 8 at time t0. Accordingly, the vehicle is generally in a forward tilted attitude at time t0. This attitude (the attitude when the front wheel braking force is larger than 0 and the rear wheel braking force is 0) is herein referred to as the first attitude.

The front wheel braking force refers to the total braking force applied to the right and left front wheels 8, and the rear wheel braking force refers to the total braking force applied to the right and left rear wheels 10. In the present embodiment, since the front wheels 8 are drive wheels, the front wheel braking force is the sum of the front wheel friction braking force and the regenerative braking force, and the rear wheel braking force is the rear wheel friction braking force. In the figure, Fr braking force refers to the front wheel braking force, and Rr braking force refers to the rear wheel braking force.

From time t0 to time t1, the front wheel braking force decreases with a decrease in regenerative braking force Fe, and the rear wheel braking force increases with an increase in rear wheel friction braking force Frr. At time t1, the ratio between the front wheel braking force and the rear wheel braking force becomes equal to the actual braking force distribution ratio. The vehicle thus changes to such an attitude that the front part of the vehicle body is located higher and the rear part of the vehicle body is located lower than in the first attitude due to the decrease in front wheel braking force and the increase in rear wheel braking force. The attitude of the vehicle at the time the ratio between the front wheel braking force and the rear wheel braking force is equal to the actual braking force distribution ratio is herein referred to as the second attitude. The vehicle greatly and rapidly changes from the first attitude to the second attitude in the pitch direction during a time Ta from time t0 to time t1.

After time t1, the rear wheel friction braking force Frr is maintained, and the front wheel friction braking force Ffr for the front wheels 8 is increased with a decrease in regenerative braking force Fe, so that the front wheel braking force is maintained. The ratio between the front wheel braking force and the rear wheel braking force is maintained at the actual braking force distribution ratio, and the attitude of the vehicle does not change. As described above, in the brake system of the related art, the attitude of the vehicle greatly and rapidly changes in the pitch direction during the time Ta. The vehicle therefore has reduced braking stability and the driver may feel uncomfortable. Especially when the required total braking force Fs is constant, the attitude of the vehicle is normally less likely to change. However, the attitude of the vehicle changes in this brake system, and the driver tends to feel uncomfortable.

In the present embodiment, the attitude of the vehicle changes slowly during the replacement control. In the replacement control of the present embodiment, the shortfall of the required total braking force Fs due to the decrease in maximum regenerative braking force Fe that is output is covered by an increase in both front wheel friction braking force Ffr and rear wheel friction braking force Frr. For example, the front wheel friction braking force Ffr and the rear wheel friction braking force Frr can be increased so that the ratio of the rear wheel friction braking force Frr to the front wheel friction braking force Ffr becomes equal to a set ratio γ, or the front wheel friction braking force Ffr and the rear wheel friction braking force Frr can be increased so that the ratio of an increase gradient ΔFrr of the rear wheel friction braking force Frr to an increase gradient ΔFfr of the front wheel friction braking force Ffr becomes equal to a set gradient ratio β. When the replacement control is finished, that is, when the regenerative braking force applied to the vehicle becomes equal to 0, the front wheel friction braking force Ffr and the rear wheel friction braking force Frr can be increased so that, for example, the ratio of the rear wheel friction braking force Frr to the front wheel friction braking force Ffr becomes equal to a target braking force distribution ratio.

When the required total braking force Fs increases (e.g., when the brake pedal 40 is further depressed) during the replacement control, this increase in required total braking force Fs is covered by an increase in rear wheel friction braking force Frr. This is because, for example, it is difficult to increase the regenerative braking force Fe during the replacement control and it is desirable to make the ratio of the rear wheel braking force to the front wheel braking force closer to the target braking force distribution ratio during the replacement control.

When the ratio of the rear wheel braking force to the front wheel braking force is equal to the target braking force distribution ratio at the start of the replacement control, or when the ratio of the rear wheel braking force to the front wheel braking force becomes equal to the target braking force distribution ratio during the replacement control, the regenerative braking force Fe is then replaced with the front wheel friction braking force Ffr for the front wheels 8 while maintaining the ratio of the rear wheel braking force to the front wheel braking force at the target braking force distribution ratio. In this case, the attitude of the vehicle does not change.

The target braking force distribution ratio is a target value of the ratio of the braking force applied to the rear wheels to the braking force applied to the front wheels (the braking force applied to the rear wheels/the braking force applied to the front wheels) which is determined in advance for the replacement control of the present embodiment. Target braking force distribution refers to distribution of the braking force to the front wheels 8 and the rear wheels 10 at the target braking force distribution ratio. The target braking force distribution ratio may be an actual braking force distribution ratio, an ideal braking force distribution ratio, an intermediate ratio between the actual braking force distribution ratio and the ideal braking force distribution ratio, etc. For example, the target braking force distribution ratio may be used as the ratio of the rear wheel friction braking force to the front wheel friction braking force (the rear wheel friction braking force/the front wheel friction braking force), or may be used as the ratio of the rear wheel braking force to the front wheel braking force (the rear wheel braking force/the front wheel braking force). In the present embodiment, the target braking force distribution ratio is the actual braking force distribution ratio.

Figure 4:
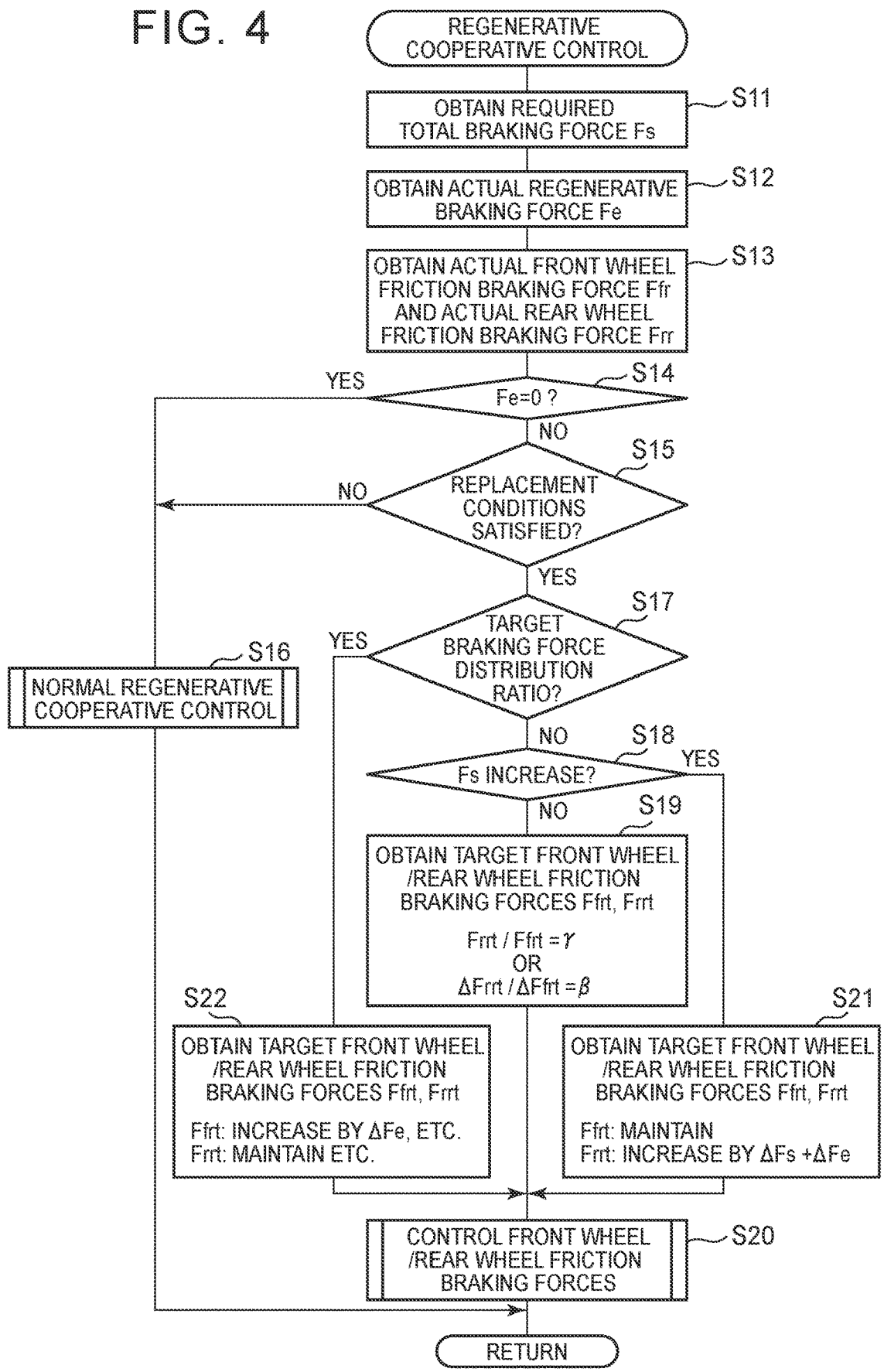
FIG. 4 is a flowchart conceptually illustrating a regenerative cooperative control program stored in a storage unit of a brake electronic control unit (ECU) of the brake system.
Figure 5:
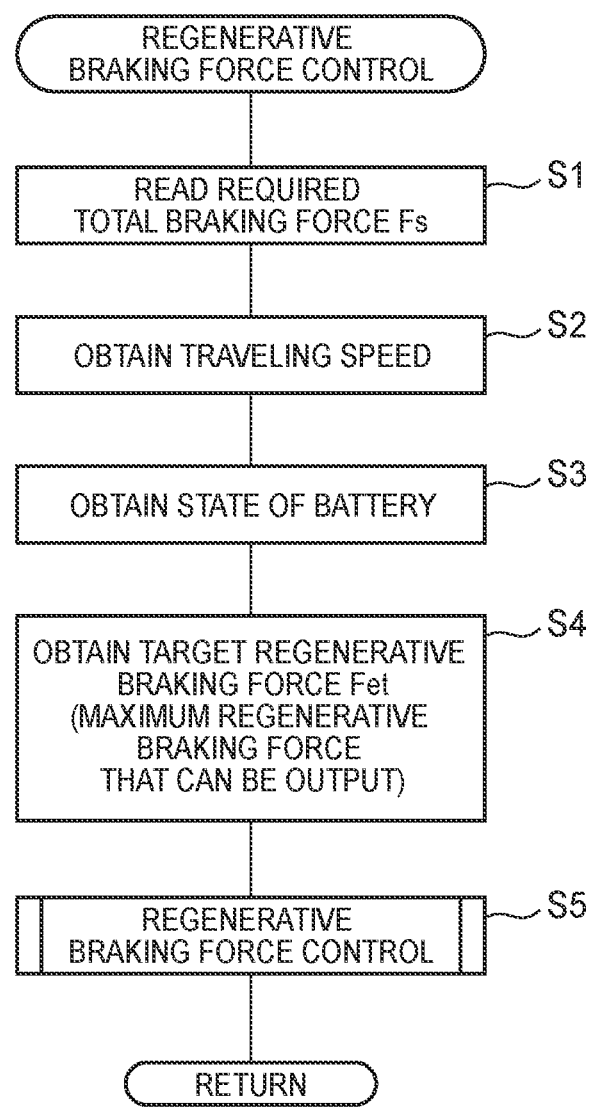
FIG. 5 is a flowchart conceptually illustrating a regenerative braking force control program stored in the storage unit.

A regenerative cooperative control program shown in the flowchart of FIG. 4 is executed at predetermined set time intervals in response to a brake operation request. A regenerative braking force control program shown in the flowchart of FIG. 5 is executed at predetermined set time intervals in response to a brake operation request. The regenerative braking force control program and the regenerative cooperative control program are executed independently. The regenerative braking force control program is executed similarly regardless of whether the replacement control is being performed.

In step 1 (hereinafter simply referred to as "S1"; the same applies to the other steps) of FIG. 5, the required total braking force Fs is obtained. The traveling speed of the vehicle is obtained in S2, and the state of charge of the battery 28 is obtained in S3. In S4, the maximum regenerative braking force that can be output is obtained within the range that is not larger than the required total braking force Fs, based on the traveling speed of the vehicle and the state of charge of the battery 28, and the maximum regenerabraking force thus obtained is set as a target regenerative braking force Fet. In S5, the regenerative brake mechanism 30 is controlled so that the actual regenerative braking force Fe becomes closer to the target regenerative braking force Fet.

In S11 of FIG. 4, the required total braking force Fs is obtained. The actual regenerative braking force Fe is obtained in S12, and the actual front wheel friction braking force Ffr and the actual rear wheel friction braking force Frr are obtained in S13. In S14, it is determined whether the actual regenerative braking force Fe is 0. In S15, it is determined whether the replacement conditions are satisfied. In S14, it is determined whether replacement end conditions are satisfied. When the determination result of S14 is YES or when the determination result of S15 is NO, the normal regenerative cooperative control is performed in S16. S11 to S16 are repeated as long as the replacement conditions are not satisfied. Namely, the normal regenerative cooperative control is performed as long as the replacement conditions are not satisfied. For example, in the normal regenerative cooperative control, a shortfall of the required total braking force Fs due to the actual regenerative braking force Fe can be covered by the rear wheel friction braking force or can be covered by the front wheel friction braking force and the rear wheel friction braking force. In the latter case, the ratio of the rear wheel friction braking force to the front wheel friction braking force may be determined in advance.

When the replacement conditions are satisfied and the determination result of S15 changes to YES, the replacement control is performed. In S17, the front wheel braking force, which is the sum of the actual front wheel friction braking force Ffr and the actual regenerative braking force Fe, is obtained, and it is determined whether the ratio of the rear wheel braking force to the front wheel braking force is equal to the target braking force distribution ratio. When the determination result of S17 is NO, it is determined in S18 whether the required total braking force Fs has increased. When the determination result of S18 is NO, the target front wheel friction braking force Ffrt and the target rear wheel friction braking force Frrt are obtained in S19 as described later. In S20, the solenoid valve devices 84, 85 etc. are controlled so that the actual front wheel friction braking force Ffr and the actual rear wheel friction braking force Frr become closer to the target front wheel friction braking force Ffrt and the target rear wheel friction braking force Frrt, respectively.

For example, in S19, the target front wheel friction braking force Ffrt and the target rear wheel friction braking force Frrt can be obtained so that the ratio (Frrt/Ffrt) becomes equal to the set ratio γ, and the set ratio γ can be a target braking force distribution ratio γx (<1). The target front wheel friction braking force Ffrt and the target rear wheel friction braking force Frrt thus obtained are given by the following expressions.

$Ffrt=(Fs-Fe)/(\gamma x+1)$ $Frrt=(Fs-Fe)*\gamma x/(\gamma x+1)$

Figure 6A:
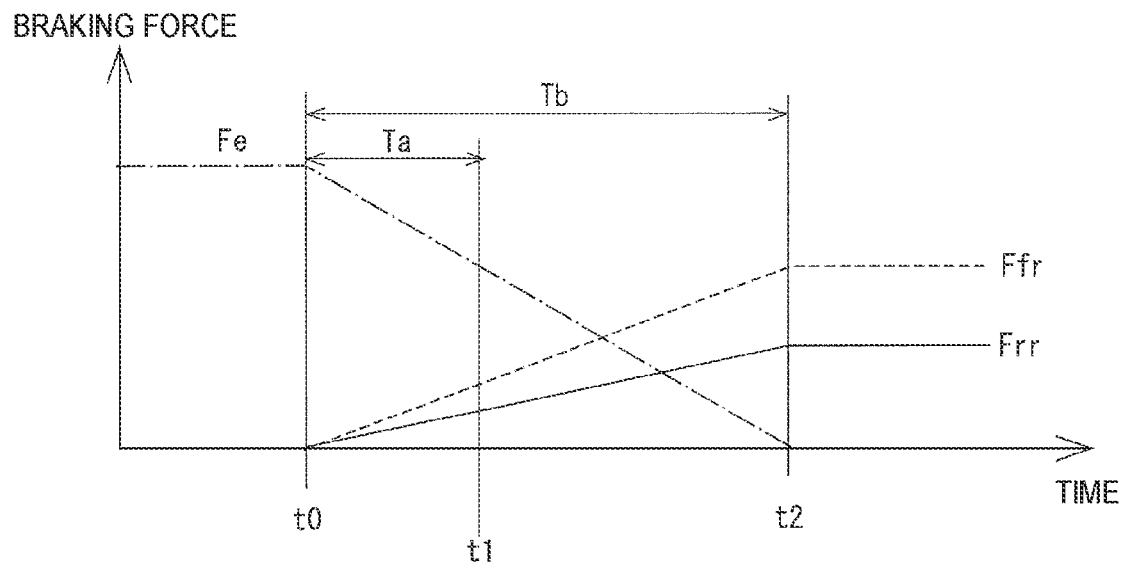
FIG. 6A is a graph illustrating an example of how a braking force changes in the brake system.
Figure 6B:
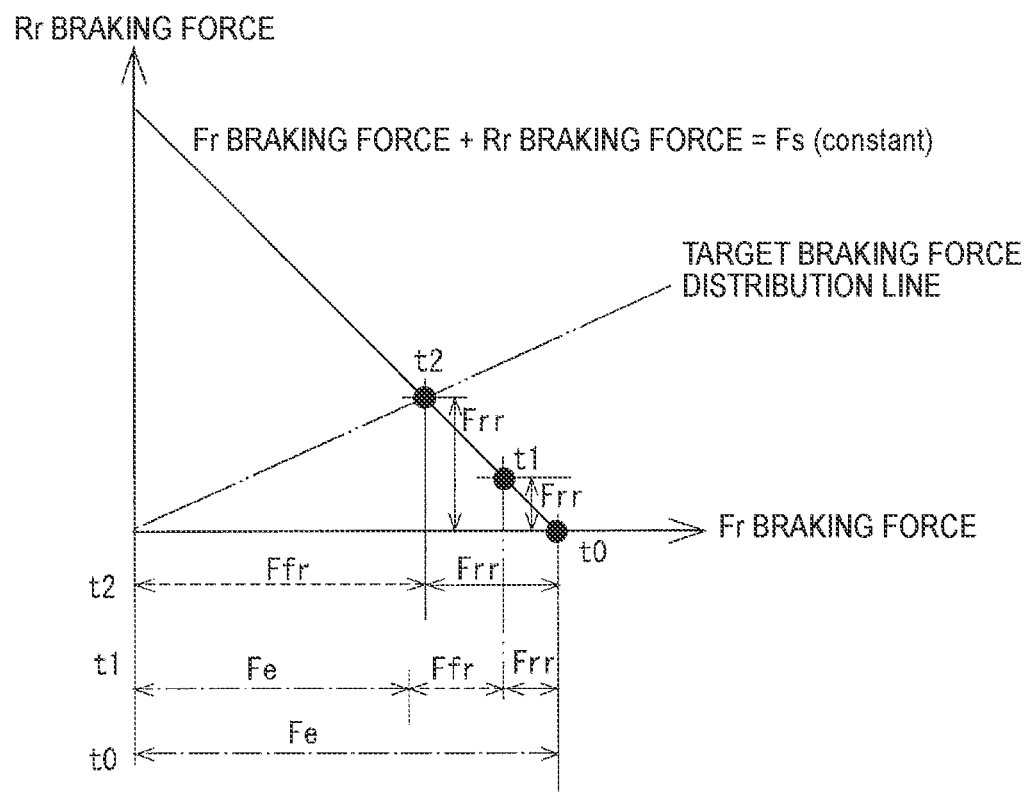
FIG. 6B is a graph illustrating the example of how the braking force changes in the brake system.

In this case, in the replacement control, a shortfall of the required total braking force Fs due to the decrease in regenerative braking force Fe is covered by increasing the front wheel friction braking force Ffr and the rear wheel friction braking force Frr while satisfying such a relationship that the ratio (Frr/Ffr) of the rear wheel friction braking force Frr to the front wheel friction braking force Ffr is equal to the target braking force distribution ratio γx, as shown in FIGS. 6A and 6B. Accordingly, the vehicle is in the first attitude at time t0, but is in the second attitude at time t2, namely when the replacement control is finished. It takes a longer time Tb than the time Ta for the vehicle to change from the first attitude to the second attitude. The attitude of the vehicle can thus be changed slower than in the brake system of the related art shown in FIGS. 17A and 17B. In FIG. 6A and the subsequent figures, a decrease gradient of the actual regenerative braking force is the same. FIGS. 6A, 6B, 7A, 7B, 9A, 9B, 10A, 10B, 12A, 12B, 13A, 13B, 15A, 15B, 16A, and 16B show a change in braking force with the required total braking force Fs being constant. The target braking force distribution line is a line passing through the target braking force distribution ratio.

In S19, when the actual rear wheel friction braking force Frr is larger than 0 at the start of the replacement control (when the replacement conditions are satisfied for the first time), the target front wheel friction braking force Ffrt and the target rear wheel friction braking force Frrt can be obtained so that the ratio (ΔFrrt/ΔFfrt) of a target increase gradient ΔFrrt of the rear wheel friction braking force Frr to a target increase gradient ΔFfrt of the front wheel friction braking force Ffr is equal to the set gradient ratio β. The target increase gradient ΔFrrt is a target value of an increase in rear wheel friction braking force Frr per cycle, and the target increase gradient ΔFfrt is a target value of an increase in front wheel friction braking force Ffr per cycle. The set gradient ratio β can be a value smaller than 1. For example, the set gradient ratio β may be obtained as follows. A front wheel friction braking force Ffre and a rear wheel friction braking force Frre at the time the replacement control is finished are obtained based on the required total braking force Fs and the target braking force distribution ratio at that point in time, an increase (Ffre–Ffrn) in front wheel friction braking force Ffr and an increase (Frre–Frrn) in rear wheel friction braking force Frr during the period from that point in time t0 the end of the replacement control are obtained, and the ratio (Frre–Frrn)/(Ffre–Ffrn) is set as a set gradient ratio βγ (<1).

$\beta y=(Frre-Frrn)/(Ffre-Ffrn)$

Based on the absolute value ΔFe (>0) of the decrease gradient, which is a decrease in actual regenerative braking force Fe per cycle, and the set gradient ratio βy, the target increase gradient ΔFfrt of the target front wheel friction braking force Ffrt and the target increase gradient ΔFrrt of the target rear wheel friction braking force Frrt are obtained as given by the following expressions.

$\Delta Ffrt=\Delta Fe/(\beta \gamma+1)$ $\Delta Frrt=\Delta Fe*\beta y/(\beta y+1)$ The current value Ffrt(n) of the target front wheel friction braking force is the previous value Ffrt(n-1) of the target front wheel friction braking force plus a target increase ΔFfrt, as given by the following expression. The same applies to the target rear wheel friction braking force Frrt.

Figure 7A:
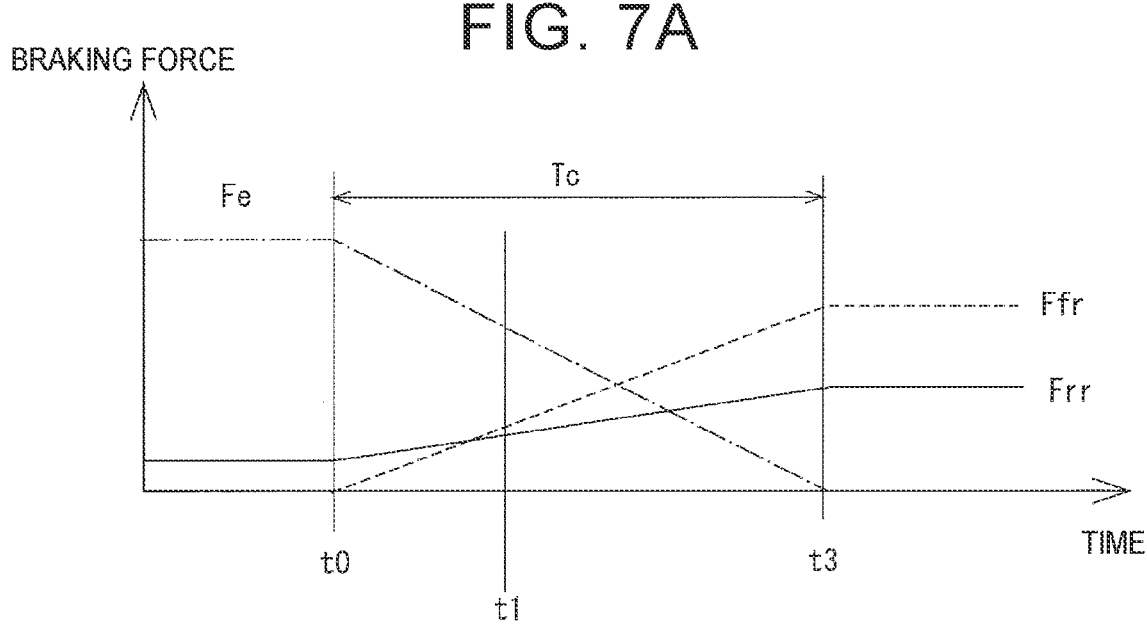
FIG. 7A is a graph illustrating another example of how the braking force changes in the brake system.
Figure 7B:
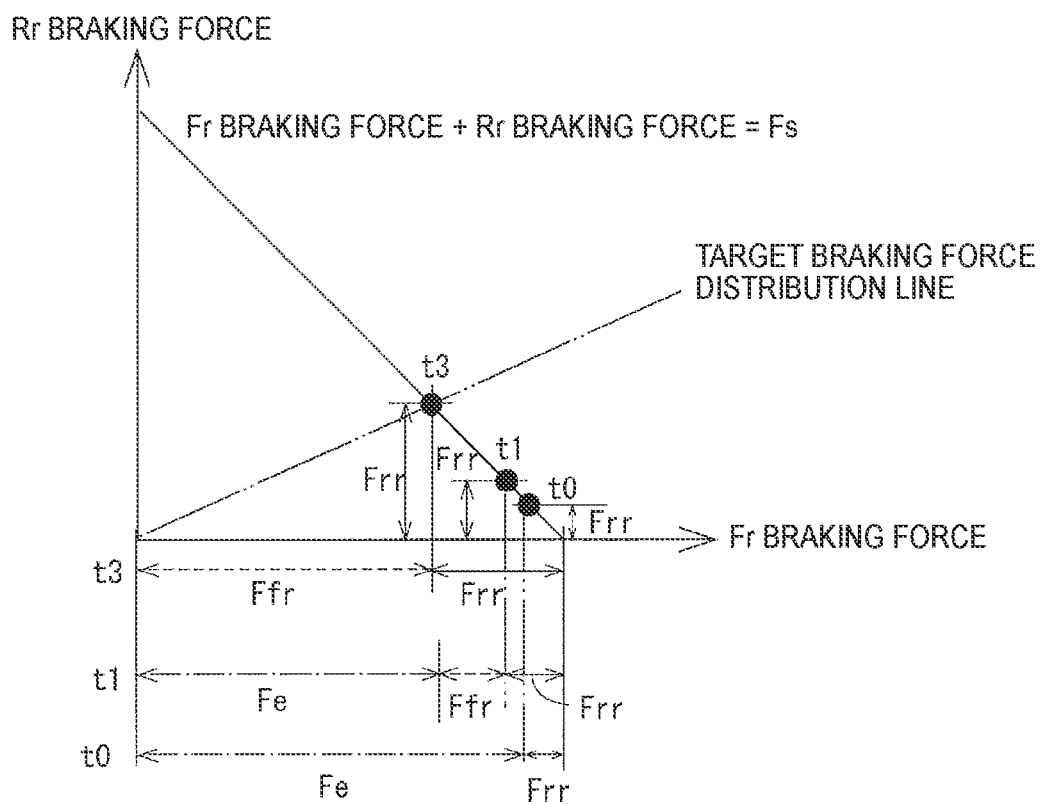
FIG. 7B is a graph illustrating the another example of how the braking force changes in the brake system.

$Ffrt(n)=Ffrt(n-1)+\Delta Fe/(\beta y+1)$ $Frrt(n)=Frrt(n-1)+\Delta Fe*\beta y/(\beta y+1)$ An example of this case is shown in FIGS. 7A and 7B. In the present embodiment, a shortfall of the required total braking force Fs due to the decrease in actual regenerative braking force Fe is covered by increasing the front wheel friction braking force Ffr and the rear wheel friction braking force Frr while satisfying such a set relationship that an increase gradient of the rear wheel friction braking force Frr is smaller than that of the front wheel friction braking force Ffr. The actual rear wheel friction braking force Frr is larger than 0 at the start of the replacement control, namely at time t0. Accordingly, when the decrease gradient of the actual regenerative braking force Fe is the same and the required total braking force Fs at the start of the replacement control is the same, a time Tc from the start of the replacement control to the end of the replacement control, namely from time t0 to time t3, is shorter than the time Tb (Tc<Tb). At time t0, namely at the start of the replacement control, the vehicle is in a first A attitude closer to the second attitude than to the first attitude. However, the vehicle changes to the second attitude at time t2, namely at the time the replacement control is finished. It is therefore presumed that the attitude changes approximately at the same rate as in the case of FIGS. 6A and 6B during the time Tc.

On the other hand, when the required total braking force Fs increases during the replacement control and the determination result of S18 changes to YES, the target front wheel friction braking force Ffrt is set to the previous value, and the target rear wheel friction braking force Frrt is increased from the previous value by the sum of the increase ΔFs in required total braking force Fs per cycle and the absolute value ΔFe (>0) of the decrease in actual regenerative braking force Fe per cycle in S21.

$$Frrt(n)=Frrt(n-1)+\Delta Fe+\Delta Fs$$

$$Ffrt(n)=Ffrt(n-1)$$

In S20, the rear wheel friction braking force Frr is increased while maintaining the front wheel friction braking force Ffr. When the required total braking force Fs is kept constant thereafter, S19 and S20 are performed.

Figure 8A:
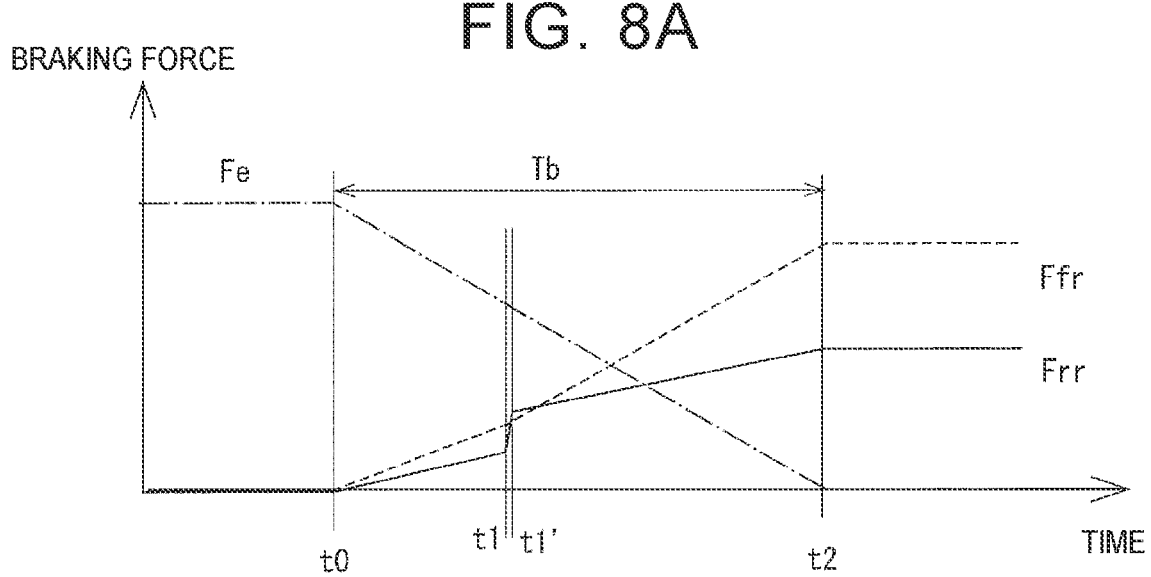
FIG. 8A is a graph illustrating still another example of how the braking force changes in the brake system.
Figure 8B:
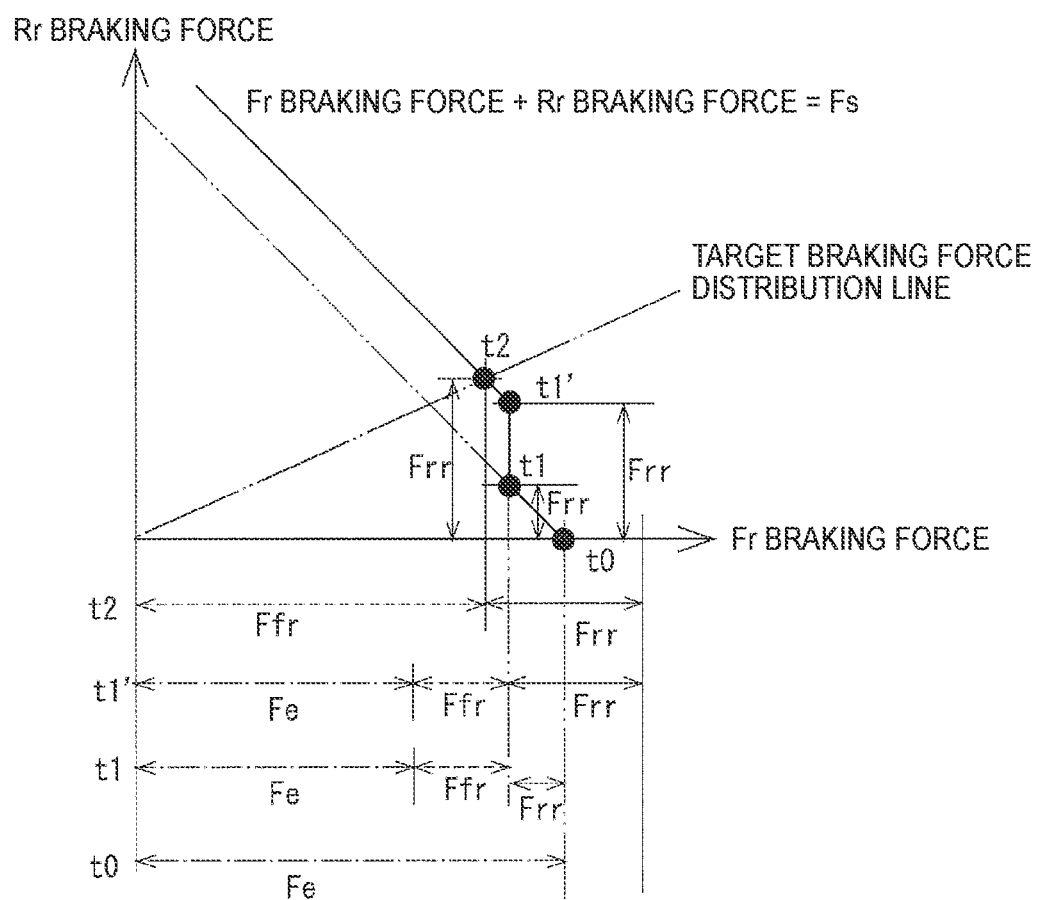
FIG. 8B is a graph illustrating the still another example of how the braking force changes in the brake system.

An example of this case is shown in FIGS. 8A and 8B. In the present embodiment, since the required total braking force Fs increases at time t1, the rear wheel friction braking force Frr is increased while maintaining the front wheel friction braking force Ffr. After time t1', the set gradient ratio βy is obtained so that, for example, the ratio of the rear wheel braking force to the front wheel braking force becomes equal to the target braking force distribution ratio at time t2, namely at the time the replacement control is finished, as in the case of FIGS. 7A and 7B. The front wheel friction braking force and the rear wheel friction braking force are increased while satisfying such a relationship that the increase gradient ratio (ΔFrr/ΔFfr) is equal to the set gradient ratio βy. In this case as well, the vehicle changes from the first attitude to the second attitude during time Tb. The attitude of the vehicle can thus be changed slower than in the brake system of the related art.

In the case where the ratio of the rear wheel braking force to the front wheel braking force becomes equal to the target braking force distribution ratio during the replacement control and the determination result of S17 changes to YES but the required total braking force Fs has not increased, the target rear wheel friction braking force Frrt is set to the previous value, and the target front wheel friction braking force Ffrt is increased from the previous value by the absolute value ΔFe of the decrease in actual regenerative braking force Fe per cycle in S22.

$$Frrt(n)=Frrt(n-1)$$

$$Ffrt(n)=Ffrt(n-1)+\Delta Fe$$

Figure 9A:
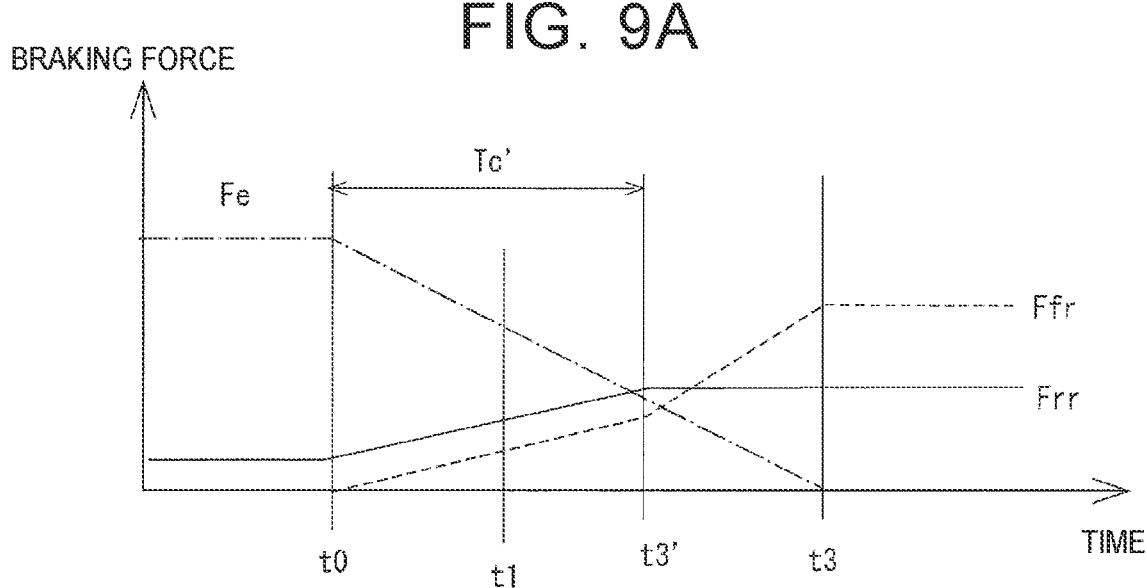
FIG. 9A is a graph illustrating yet another example of how the braking force changes in the brake system.
Figure 9B:
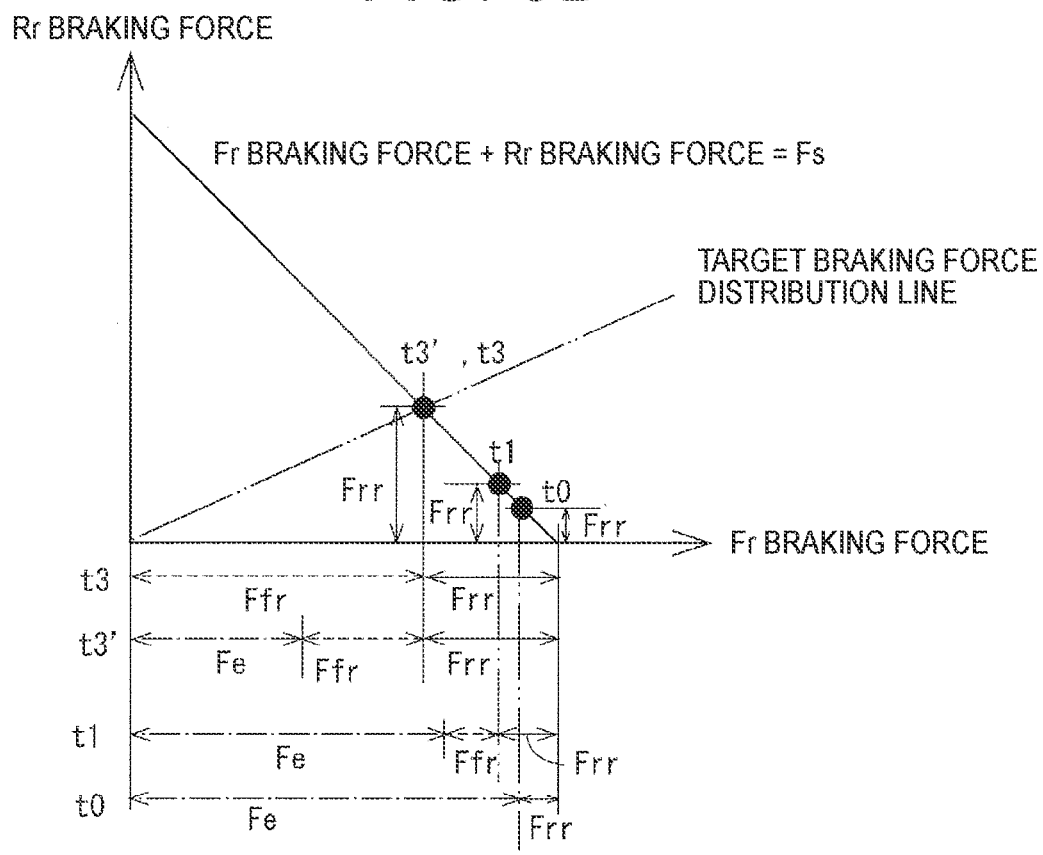
FIG. 9B is a graph illustrating the yet another example of how the braking force changes in the brake system.

In S20, the front wheel friction braking force Ffr for the front wheels is increased by an amount corresponding to the decrease in actual regenerative braking force while maintaining the rear wheel friction braking force Frr. An example of this case is shown in FIGS. 9A and 9B.

In the present embodiment, the front wheel friction braking force and the rear wheel friction braking force are increased from the start of the replacement control (t0) while satisfying such a relationship that the ratio of the increase gradient ΔFrrt of the rear wheel friction braking force Frrt to the increase gradient ΔFfrt of the front wheel friction braking force Ffrt is equal to the set gradient ratio β. In this case, the set gradient ratio β is set to 1. The ratio of the rear wheel braking force to the front wheel braking force becomes equal to the target braking force distribution ratio at time t3' during the replacement control. Accordingly, the determination result of S17 changes to YES, and S22 and S20 are performed. The rear wheel friction braking force Frr is kept constant, and for the front wheels, the regenerative braking force Fe is replaced with the front wheel friction braking force Ffr. In the present embodiment, at time t3' before time t3, the ratio of the rear wheel braking force to the front wheel braking force becomes equal to the target braking force distribution ratio, and the vehicle changes to the second attitude. The vehicle changes from the first A attitude to the second attitude during a time Tc'. In this case, the attitude of the vehicle changes more quickly than in the case of FIGS. 7A and 7B but slower than in the brake system of the related art shown in FIGS. 17A and 17B.

When the determination result of S17 changes to YES and the required total braking force Fs has been increased, the target front wheel friction braking force Ffrt and the target rear wheel friction braking force Frrt are obtained while keeping the ratio of the rear wheel braking force to the front wheel braking force equal to the target braking force distribution ratio in S22 and S20. The front wheel braking force and the rear wheel braking force are increased according to the target braking force distribution line.

Figure 10A:
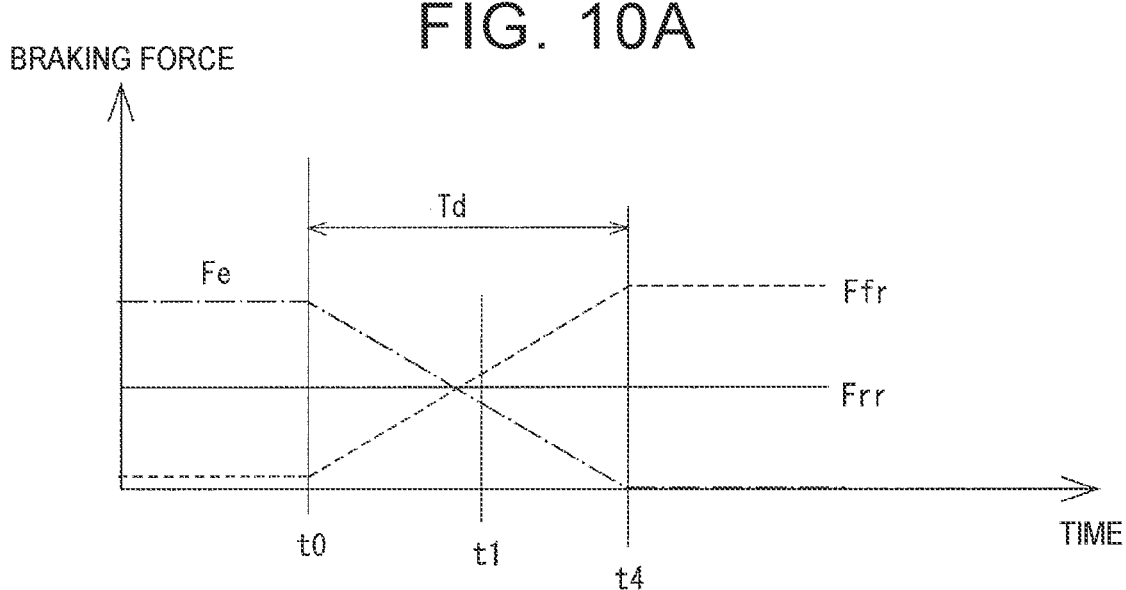
FIG. 10A is a graph illustrating a further example of how the braking force changes in the brake system.
Figure 10B:
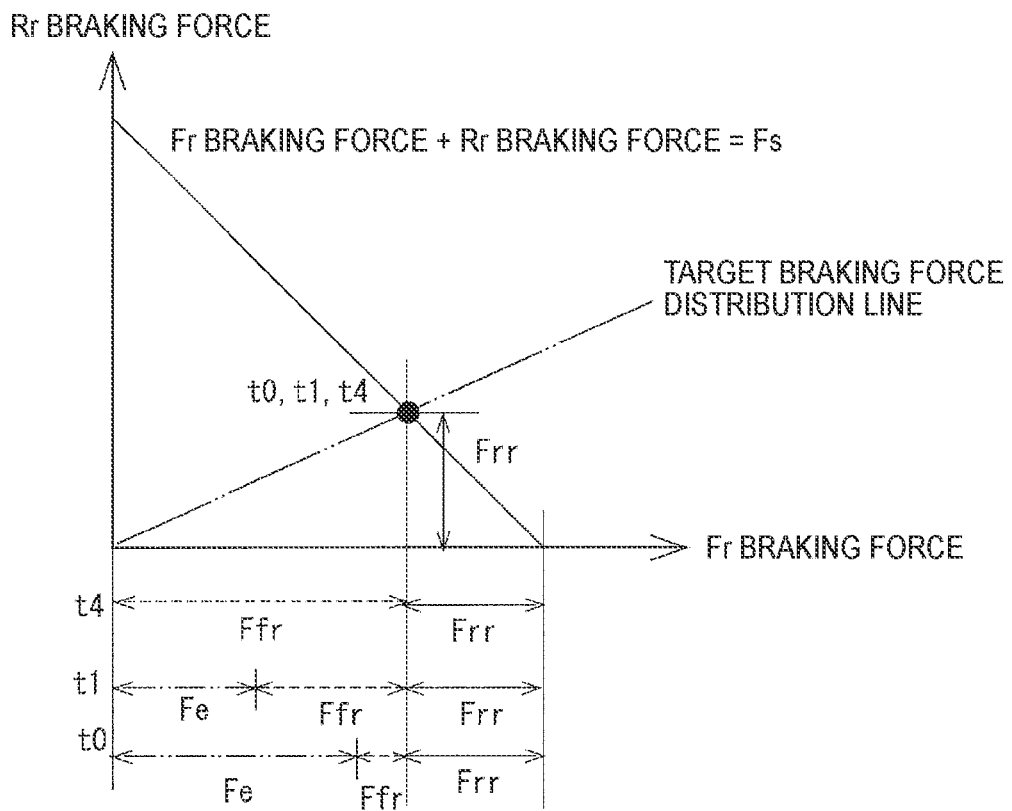
FIG. 10B is a graph illustrating the further example of how the braking force changes in the brake system.

FIGS. 10A and 10B show an example in which the determination result of S17 changes to YES at the start of the replacement control. In the present embodiment, the braking force Fe is replaced with the front wheel friction braking force Ffr on the front wheels, and the attitude of the vehicle will not change during the replacement control. Since the front wheel friction braking force Ffr is increased by an amount corresponding to the decrease in regenerative braking force Fe, a time Td required for the replacement control is shorter than in the case shown in FIGS. 6A to 9B.

Figure 11:
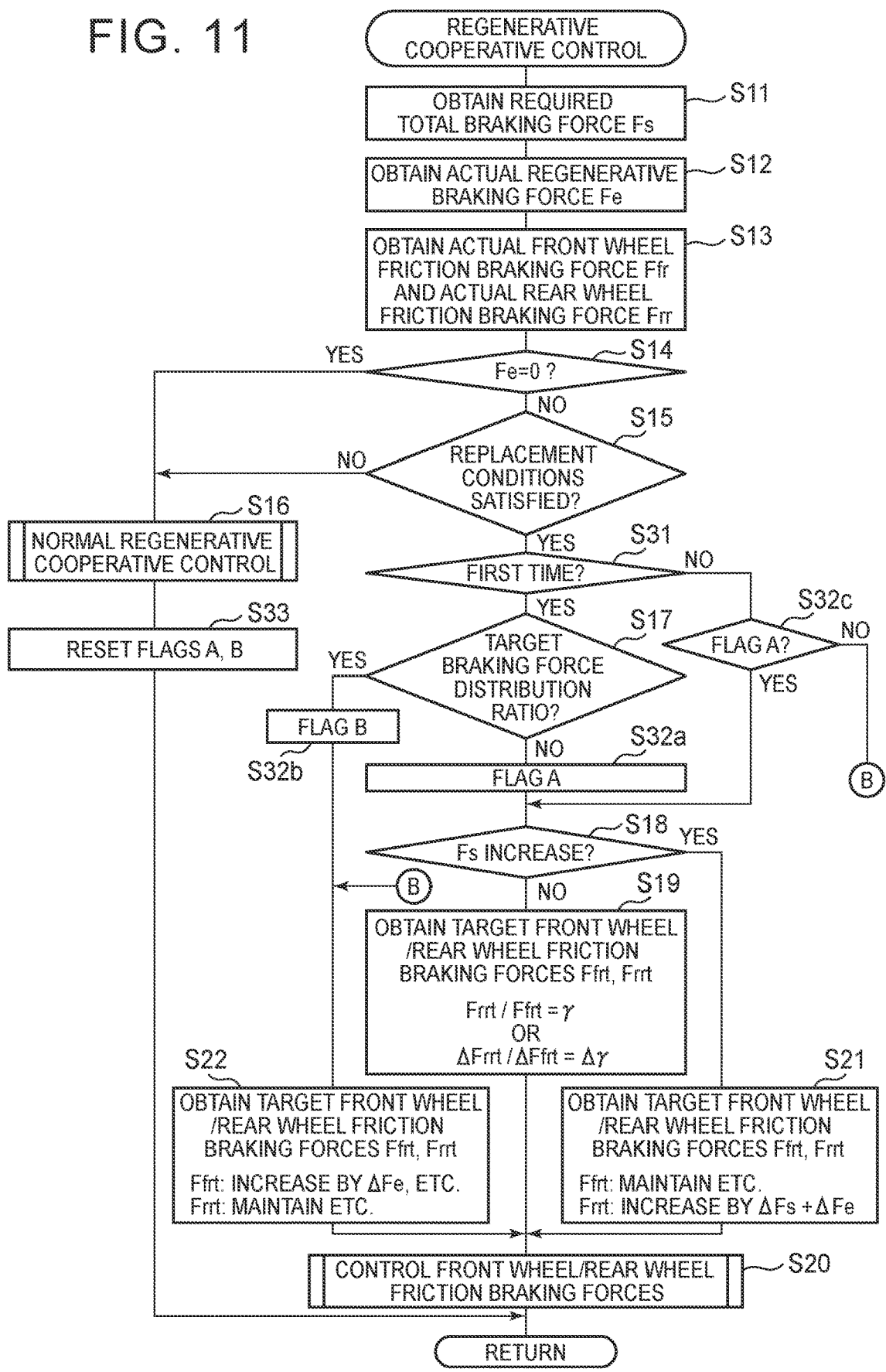
FIG. 11 is a flowchart conceptually illustrating another regenerative cooperative control program stored in the storage unit of the brake ECU of the brake system.

In the present embodiment, whether the ratio of the rear wheel braking force to the front wheel braking force is equal to the target braking force distribution ratio is determined both at the start of the replacement control and during the replacement control. However, S17 may be performed when the replacement conditions are satisfied for the first time (at the start of the replacement control) and may not be performed during the replacement control. An example of a regenerative cooperative control program in this case is shown in the flowchart of FIG. 11. In the regenerative cooperative control program of FIG. 11, the same steps as those of the regenerative cooperative control program of FIG. 4 are denoted with the same step numbers as those of FIG. 4, and description thereof will be omitted.

After S15, it is determined in S31 whether this is the first time the replacement conditions are satisfied. When the determination result of S15 was NO at the previous time but is YES at this time, the determination result of S31 is YES. In S17, it is determined whether the ratio of the rear wheel braking force to the front wheel braking force is equal to the target braking force distribution ratio. When the determination result of S17 is NO, a flag A is set in S32a, and S18 to S21 are performed in a manner similar to that in FIG. 4. When the determination result of S17 is YES, a flag B is set in S32b, and S22 and S20 are performed in a manner similar to that in FIG. 4. The next time this program is executed, the determination result of S31 is NO. It is therefore determined in S32c whether the flag A has been set. When the determination result of S32c is YES, S18 to S21 are performed. When the determination result of S32c is NO, S22 and S20 are performed. When the determination result of S14 is YES or the determination result of S15 is NO, the flags A, B are reset in S33.

For example, when the determination result of S17 changes to YES at the start of the replacement control, the control is performed as shown in FIGS. 10A and 10B. When the determination result of S17 changes to NO at the start of the replacement control, it will no longer be determined in S17 whether the ratio of the rear wheel braking force to the front wheel braking force is equal to the target braking force distribution ratio. Accordingly, the replacement control can be performed so that the ratio of the rear wheel braking force to the front wheel braking force does not become equal to the target braking force distribution ratio at the time the replacement control is finished. Examples of this case are shown in FIGS. 12A, 12B, 13A, and 13B.

In this case, in S19, the ratio (Frrt/Ffrt) of the target rear wheel friction braking force Frrt to the target front wheel friction braking force Ffrt can be set to a set ratio $\gamma y$ ($>1$) larger than 1.

$$Ffrt=(Fs-Fe)/(\gamma y+1)$$

$$Frrt=(Fs-Fe)*\gamma y/(\gamma y+1)$$

Figure 12A:
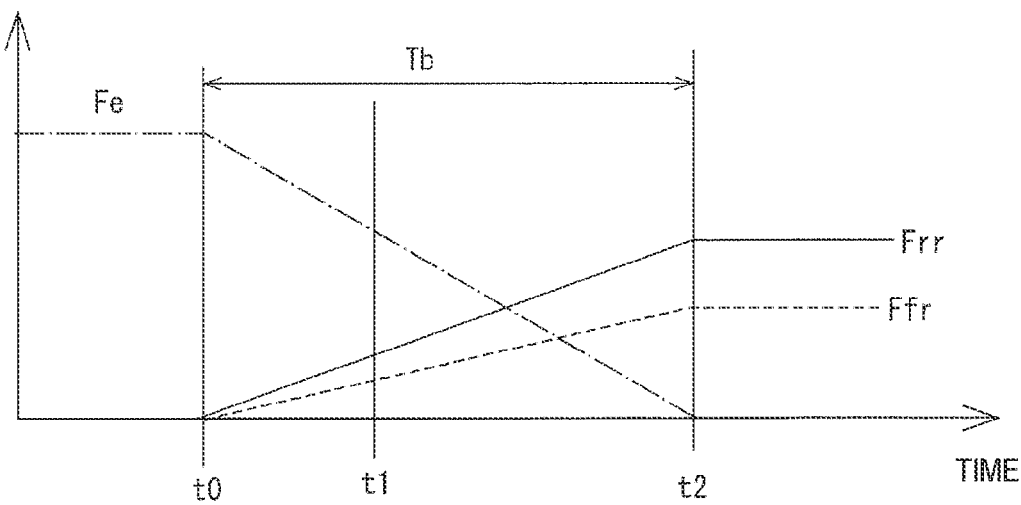
FIG. 12A is a graph illustrating a still further example of how the braking force changes in the brake system.
Figure 12B:
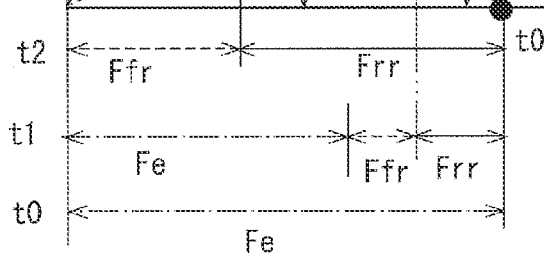
FIG. 12B is a graph illustrating the still further example of how the braking force changes in the brake system.

As shown in FIGS. 12A and 12B, in the replacement control, the front wheel friction braking force Ffr and the rear wheel friction braking force Frr are increased while satisfying such a relationship that the rear wheel friction braking force Frr is larger than the front wheel friction braking force Ffr. When the replacement control is finished (time t2), the rear wheel braking force is larger than the target braking force distribution ratio, and therefore the vehicle changes to a second A attitude that is an attitude with a larger rear braking force than the second attitude. In the replacement control, the attitude of the vehicle thus changes to a larger extent and more rapidly during the time Tb as compared to the case where the vehicle is in the second attitude at time t2. However, a change (jerking) that occurs to the vehicle body in the pitch direction when the vehicle is stopped after the replacement control is finished is reduced.

In S19, the set ratio $\gamma$ can be set to 1.

$$Ffrt=(Fs-Fe)/2$$

$$Frrt=(Fs-Fe)/2$$

Figure 13A:
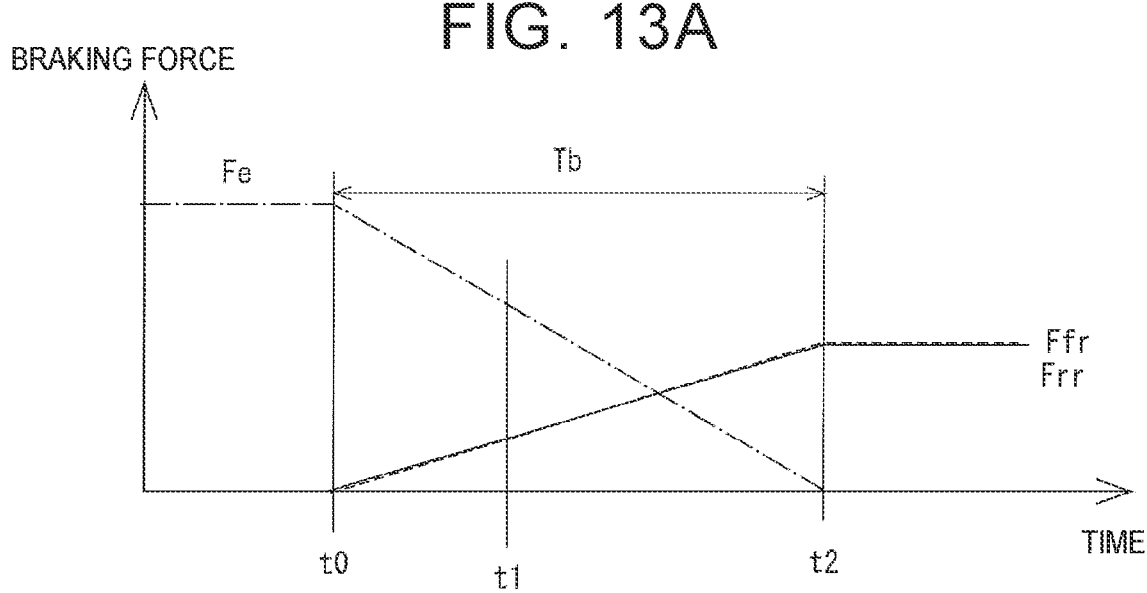
FIG. 13A is a graph illustrating a yet further example of how the braking force changes in the brake system.
Figure 13B:
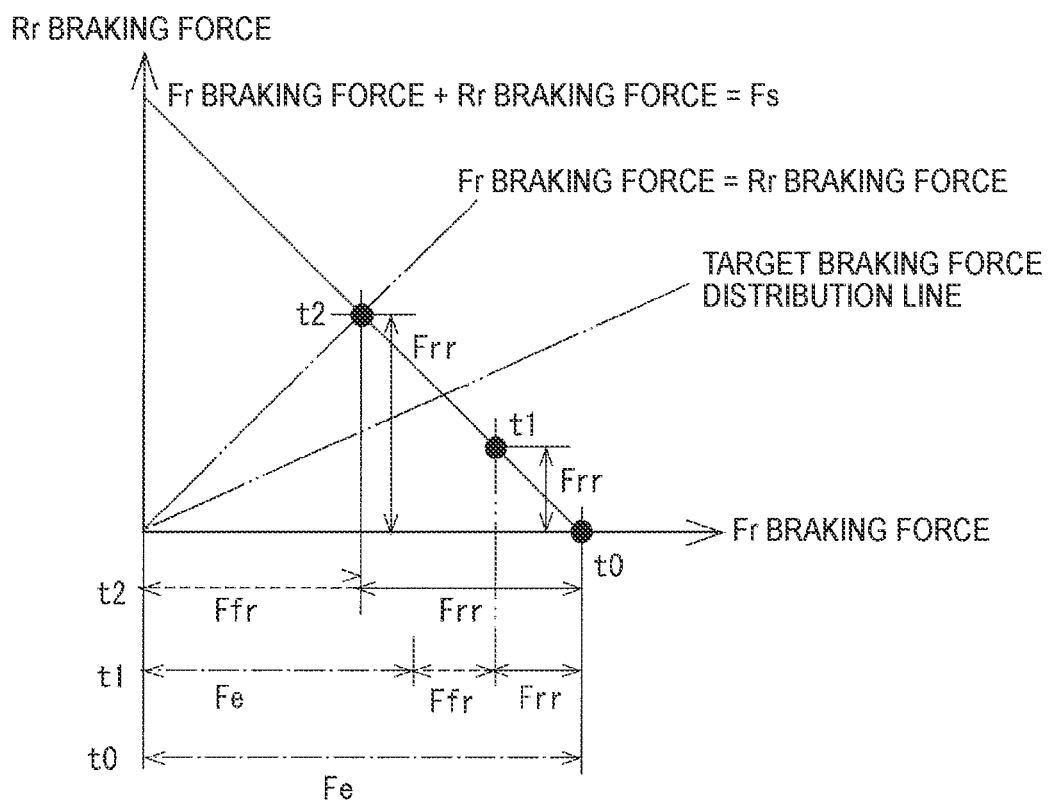
FIG. 13B is a graph illustrating the yet further example of how the braking force changes in the brake system.

In this case, as shown in FIGS. 13A and 13B, the front wheel friction braking force Ffr and the rear wheel friction braking force Frr are increased while satisfying such a relationship that the front wheel friction braking force Ffr and the rear wheel friction braking force Frr are the same. In this case, when the replacement control is finished (time t2), the rear wheel friction braking force Frr is larger than in the case where the set ratio is set to the target braking force distribution ratio yx (in the case shown in FIGS. 6A and 6B), but the rear wheel friction braking force Frr is smaller than in the case where the set ratio is set to a value yy larger than 1 (in the case shown in FIGS. 12A and 12B). The vehicle therefore changes to a second B attitude that is an intermediate attitude between the second attitude and the second A attitude. Accordingly, both the change in attitude during the time Tb and the rate at which the attitude changes are intermediate between the case shown in FIGS. 6A and 6B and the case shown in FIGS. 12A and 12B. A change that occurs to the vehicle body in the pitch direction when the vehicle is stopped is also intermediate between the case shown in FIGS. 6A and 6B and the case shown in FIGS. 12A and 12B.

In these cases, it can be considered that the target braking force distribution ratio is set to a value equal to or larger than 1.

As described above, in the present embodiment, the front wheel friction braking force control device is composed of the solenoid valve devices 84FR, 84FL of the hydraulic control unit 48 etc., and the rear wheel friction braking force control device is composed of the solenoid valve devices 85RR, 85RL of the hydraulic control unit 48 etc. The regenerative braking force control unit is composed of a part of the brake ECU 100 which stores the regenerative braking force control program shown by the flowchart of FIG. 5, a part of the brake ECU 100 which executes this regenerative braking force control program, etc. The regenerative cooperative control unit is composed of a part of the brake ECU 100 which stores the regenerative cooperative control program shown by the flowchart of FIG. 4, a part of the brake ECU 100 which executes this regenerative cooperative control program, etc. The replacement control unit is composed of a part of the regenerative cooperative control unit which stores S11 to S15 and S17 to S22, a part of the regenerative cooperative control unit which performs S11 to S15 and S17 to S22, etc. The replacement control unit is also the first replacement control unit. The target regenerative braking force obtaining unit is composed of a part of the regenerative braking force control unit which stores S1 to S4, a part of the regenerative braking force control unit which performs S1 to S4, etc. The second replacement control unit is composed of a part of the regenerative cooperative control unit which stores S15, 31, 17, 32, 22, and 20 of FIG. 11, a part of the regenerative cooperative control unit which performs S15, 31, 17, 32, 22, and 20 of FIG. 11, etc. (a part of the regenerative cooperative control unit which performs S22 and S20 when the determination result of S17 changes to YES at the start of the replacement control of FIG. 4, etc.)

Second Embodiment

Figure 14:
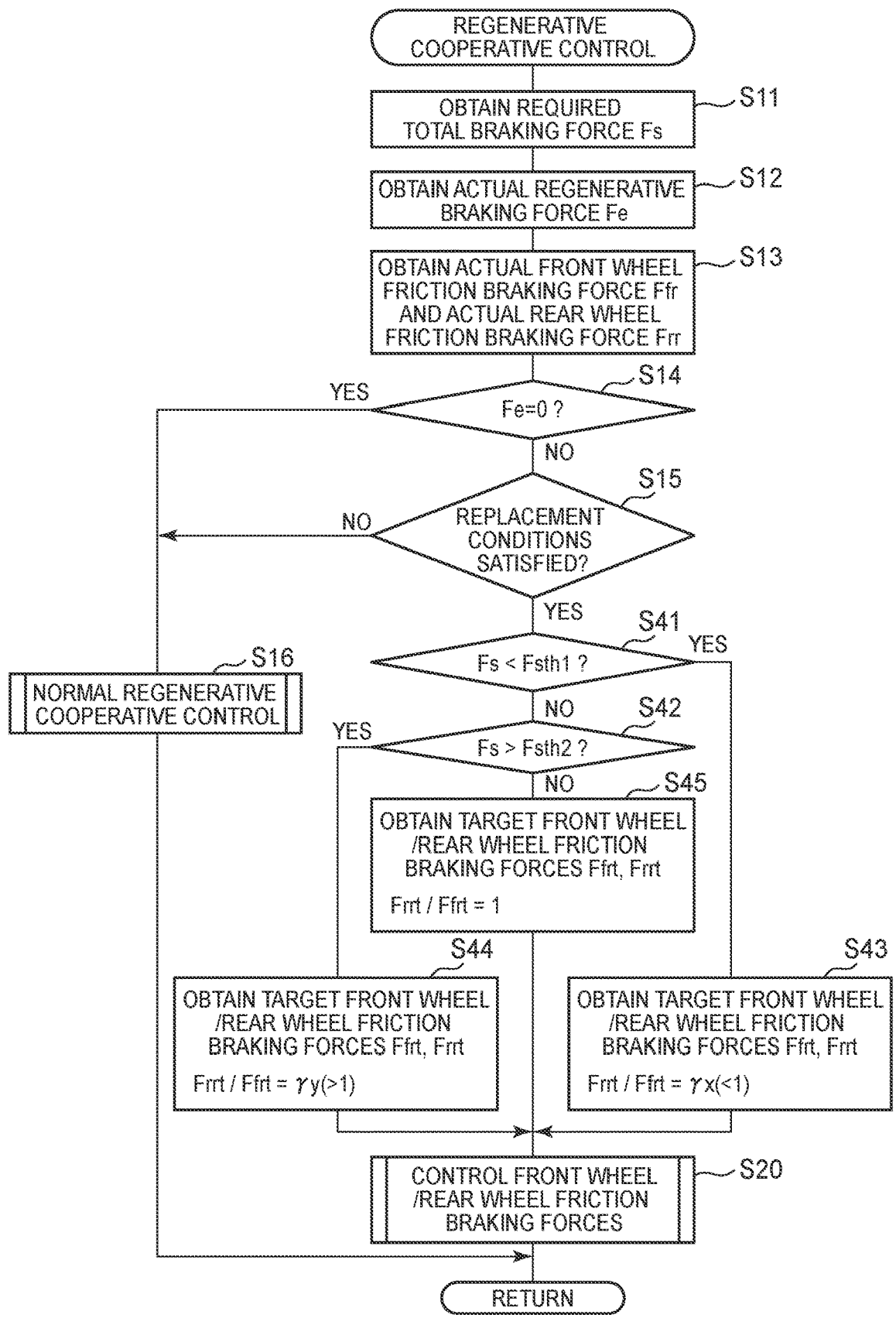
FIG. 14 is a flowchart conceptually illustrating a regenerative cooperative control program stored in a storage unit of a brake ECU of a brake system according to a second embodiment.

The manner in which the replacement control is performed is not limited to the manners described in the above embodiment. For example, in the case where the front wheel friction braking force Ffr and the rear wheel friction braking force Frr are increased in the replacement control while satisfying such a relationship that the ratio $\gamma$ of the rear wheel friction braking force Frr to the front wheel friction braking force Ffr is equal to a set ratio, the set ratio $\gamma$ may be set to the target braking force distribution ratio $\gamma x$ smaller than 1 when the required total braking force Fs is smaller than a first set value Fsth1, the set ratio $\gamma$ may be set to a value larger than 1 when the required total braking force Fs is larger than a second set value Fsth2 larger than the first set value, and the set ratio $\gamma$ may be set to 1 when the required total braking force Fs is equal to or larger than the first set value and equal to or smaller than the second set value. An example of the regenerative cooperative control program in this case is shown in FIG. 14. In the regenerative cooperative control program of FIG. 14, the same steps as those of the regenerative cooperative control program of FIG. 4 are denoted with the same step numbers as those of FIG. 4, and description thereof will be omitted.

When the determination result of S15 is YES, it is determined in S41 whether the required total braking force Fs is smaller than a first set braking force Fsth1, and it is determined in S42 whether the required total braking force Fs is larger than a second set braking force Fsth2. When the determination result of S41 is YES, the set ratio γ is set to a front wheel/rear wheel braking force distribution ratio γx in S43. When the determination result of S42 is YES, the set ratio γ is set to a value γy larger than 1 in S44. When the determination results of S41, 42 are NO, the set ratio γ is set to 1. In the present embodiment, S41 and S42 are performed even during the replacement control. Accordingly, when the required total braking force Fs changes during the replacement control, the ratio of the target rear wheel friction braking force Frrt to the target front wheel friction braking force Ffrt also changes accordingly.

As described above, the ratio of the rear wheel braking force to the front wheel braking force is set to a larger value when the required total braking force Fs is large than when it is small. This can reduce a change in attitude in the pitch direction which occurs when the vehicle is stopped. Alternatively, the ratio of the rear wheel braking force to the front wheel braking force may be set to a smaller value when the required total braking force Fs is large than when it is small. In this case, the rear wheels are less likely to slip.

In the present embodiment, it can be considered that the target braking force distribution ratio in the replacement control is determined based on the magnitude of the required total braking force Fs.

Third Embodiment

Figure 15A:
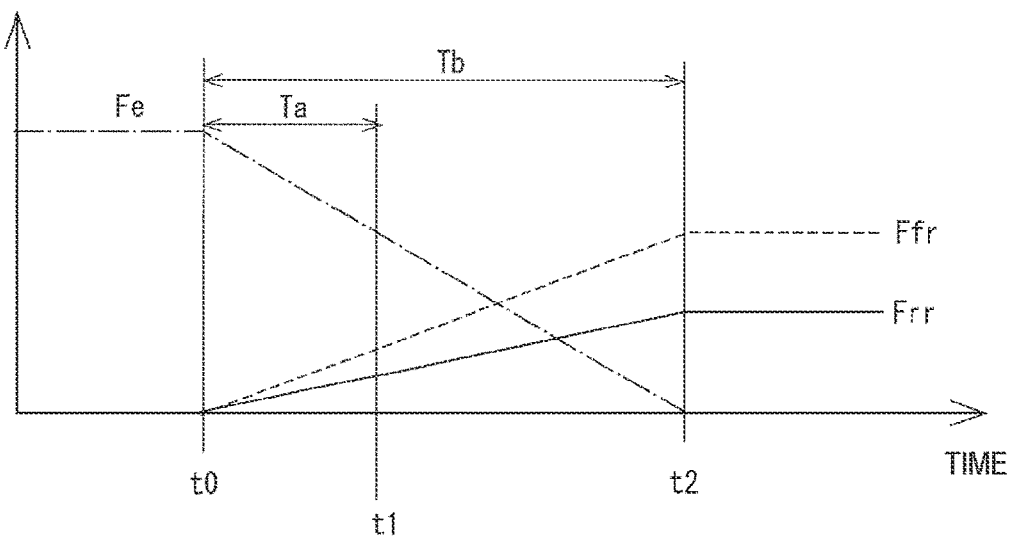
FIG. 15A is a graph illustrating an example of how a braking force changes in a brake system according to a third embodiment.
Figure 15B:
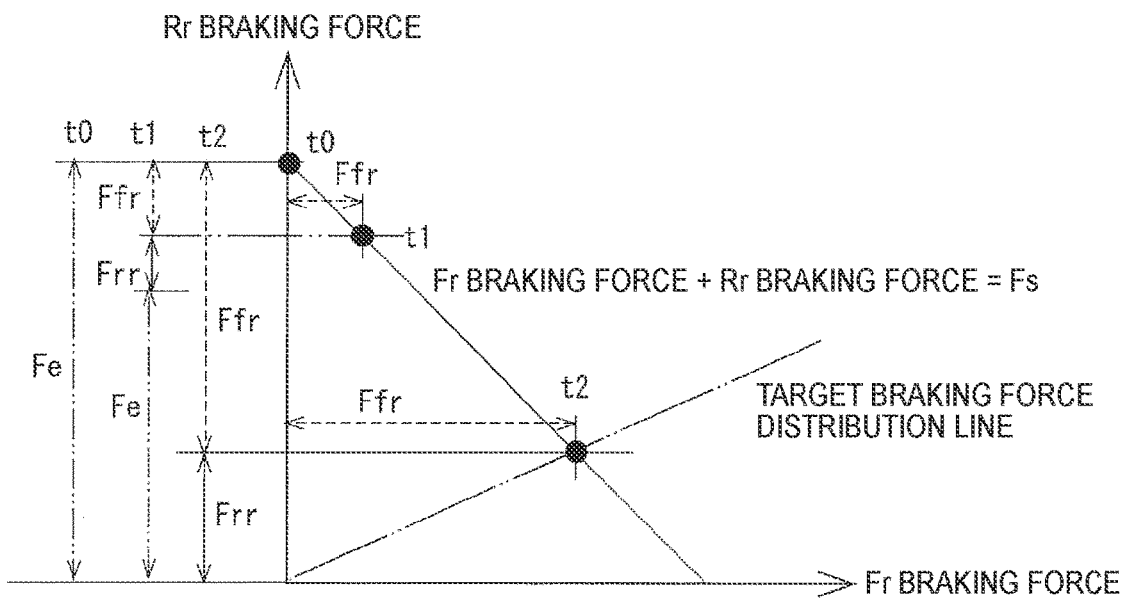
FIG. 15B is a graph illustrating the example of how the braking force changes in the brake system according to the third embodiment.

The brake system is also applicable to rear wheel drive vehicles. In the present embodiment, the front wheel friction braking force Ffr and the rear wheel friction braking force Frr are increased with a decrease in regenerative braking force applied to the rear wheels 10RR, 10RL. An example of this case is shown in FIGS. 15A and 15B. In the present embodiment, at time t0, namely at the start of the replacement control, the front wheel braking force is 0 and the vehicle is in a third attitude that is an attitude having the regenerative braking force Fe being applied to the rear wheels. At time t2, namely when the replacement control is finished, the vehicle is in the second attitude with the ratio of the rear wheel braking force to the front wheel braking force being equal to the target braking force distribution ratio. Accordingly, the attitude of the vehicle changes to a larger extent and more rapidly during the time Tb from the start of the replacement control (t0) to the end of the replacement control (t2) as compared to the brake system of the first embodiment. However, the attitude of the vehicle changes to a smaller extent and more slowly as compared to the brake system of the related art shown in FIGS. 17A and 17B.

Figure 16A:
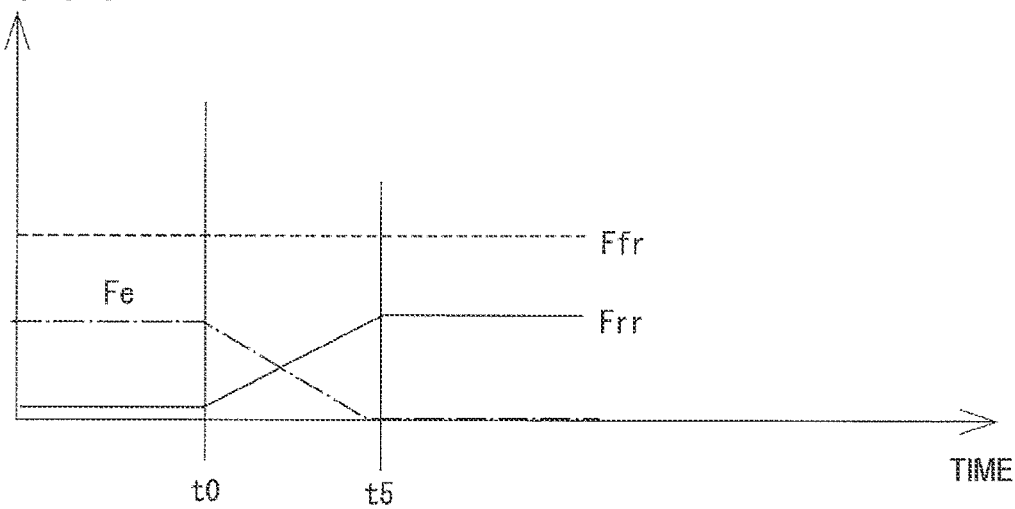
FIG. 16A is a graph illustrating another example of how the braking force changes in the brake system.
Figure 16B:
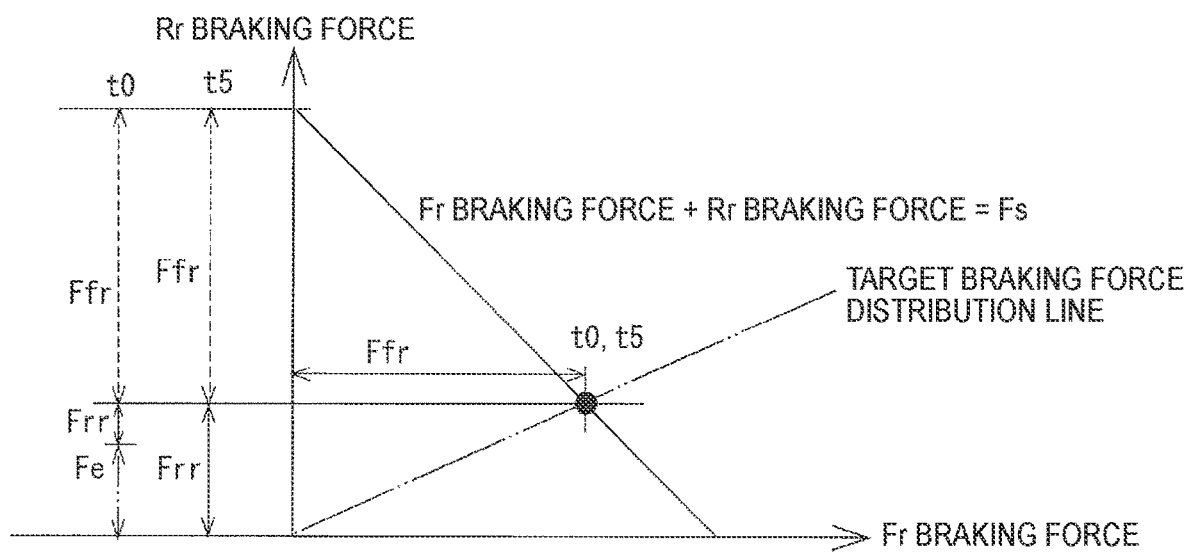
FIG. 16B is a graph illustrating the another example of how the braking force changes in the brake system.

When the replacement conditions are satisfied for the first time and the ratio of the rear wheel braking force to the front wheel braking force is equal to the target braking force distribution ratio, the regenerative braking force Fe is replaced with the rear wheel friction braking force Frr for the rear wheels while maintaining the front wheel friction braking force Ffr that is the front wheel braking force. An example of this case is shown in FIGS. 16A and 16B. In the present embodiment, the attitude of the vehicle does not change during the replacement control. Although not shown in the figures, each of the first and second embodiments can also be implemented similarly in brake systems of rear wheel drive vehicles.

Although the plurality of embodiments are described above, the present disclosure can be carried out in various modified or altered forms based on the knowledge of those skilled in the art, in addition to the above embodiments. For example, in the brake systems according to the above embodiments, the hydraulic brakes are mounted on the four wheels, namely the right and left front wheels and the right and left rear wheels. However, an electric brake may be mounted on at least one of the front wheel side and the rear wheel side. The replacement conditions are not limited to those in the above embodiments. For example, the replacement conditions may be that the regenerative braking force Fe has decreased at a gradient equal to or larger than a set gradient, etc. The present disclosure is not limited to front wheel drive vehicles or rear wheel drive devices and are also applicable to four wheel drive vehicles. In the four wheel drive vehicles, the ratio of the rear wheel braking force to the front wheel braking force is often equal to the target braking force distribution ratio when the replacement control is started. However, this is not always the case.

The embodiments that are recognized as being able to be claimed in the present application will be shown below.

(1) A brake system includes: a friction brake mechanism including (a) a front wheel friction brake that is a friction brake provided for a front wheel of a vehicle, (b) a rear wheel friction brake that is a friction brake provided for a rear wheel of the vehicle, (c) a front wheel friction braking force control device configured to control a front wheel friction braking force applied to the front wheel by the front wheel friction brake, and (d) a rear wheel friction braking force control device configured to control a rear wheel friction braking force applied to the rear wheel by the rear wheel friction brake; a regenerative brake mechanism configured to apply a regenerative braking force to a drive wheel of the vehicle by regenerative braking of an electric motor that drives and rotates the drive wheel, and configured to control the regenerative braking force; a regenerative braking force control unit configured to obtain, as a target regenerative braking force, a maximum regenerative braking force that can be output within a range that is not larger than a required total braking force, and configured to control the regenerative brake mechanism based on the target regenerative braking force to control the regenerative braking force applied to the drive wheel, the required total braking force being a braking force required for the vehicle, and the maximum regenerative braking force being determined by a state of the vehicle; a regenerative cooperative control unit configured to control the front wheel friction braking force control device and the rear wheel friction braking force control device so that the required total braking force, which is the braking force required for the vehicle, is satisfied by one or more of the regenerative braking force controlled by the regenerative braking force control unit, the front wheel friction braking force, and the rear wheel friction braking force; and a replacement control unit configured to perform replacement control when a predetermined replacement condition is satisfied, the replacement control being control in which the regenerative cooperative control unit covers a shortfall of the required total braking force, which is caused by a decrease in the regenerative braking force controlled by the regenerative braking force control unit, by increasing the front wheel friction braking force and the rear wheel friction braking force while satisfying a set relationship between the front wheel friction braking force and the rear wheel friction braking force or between an increase gradient of the front wheel friction braking force and an increase gradient of the rear wheel friction braking force, whereby a state in which the regenerative braking force is applied to the vehicle is replaced with a state in which the front wheel friction braking force and the rear wheel friction braking force are applied to the vehicle with no regenerative braking force applied to the vehicle.

The friction brake is a brake that restrains rotation of the wheel by pressing a friction engagement member against a brake rotary body that rotates with the wheel by a pressing device and thus frictionally engaging the friction engaging member and the brake rotary body. The pressing device may be either a device that presses the friction engagement member against the brake rotary body using a fluid pressure such as a pneumatic pressure or a hydraulic pressure or a device that presses the friction engagement member against the brake rotary body using an electric actuator.

For example, when the friction brake is a brake using the fluid pressure, each of the front wheel friction braking force control device and the rear wheel friction braking force control device may include one or more solenoid valves capable of controlling the fluid pressure. When the friction brake is a brake including an electric actuator, each of the front wheel friction braking force control device and the rear wheel friction braking force control device may include a drive circuit connected to the electric actuator and an electric actuator control unit mainly composed of a computer for controlling the drive circuit.

The electric motor that drives and rotates the drive wheel may be mounted on the drive wheel or may be connected to the drive wheel. In any case, the drive wheel is driven and rotated by the electric motor, so that the vehicle travels. In other words, a set relationship is satisfied between the rotational speed of the electric motor, the rotational speed of the drive wheel, and the traveling speed of the vehicle. In the regenerative brake mechanism, a battery is connected to the electric motor via an inverter. A current supplied to the electric motor is controlled by control of the inverter. The electric motor is thus controlled, and the rotational braking force is controlled.

In the replacement control, the shortfall of the required total braking force due to the decrease in regenerative braking force is covered by increasing both of the front wheel friction braking force and the rear wheel friction braking force at least during a part of the entire process from the start of the replacement control to the end of the replacement control.

The replacement control is started when a replacement start condition is satisfied, and is finished when the regenerative braking force applied to the vehicle becomes equal to 0 and a replacement end condition is satisfied. The replacement condition may be the replacement start condition, the condition that the replacement control is performed, etc. For example, the traveling speed of the vehicle being equal to or lower than a set speed is the replacement start condition and can also be the condition that the replacement control is performed. The replacement control may be performed as long as the traveling speed of the vehicle is equal to or lower than the set speed. The decrease gradient of the regenerative braking force becoming equal to or larger than a set gradient is the replacement start condition but is not necessarily the condition that the replacement control is performed.

In the case where the brake system according to (1) is applied to a front wheel drive vehicle or a rear wheel drive vehicle in which a front wheel or a rear wheel is a drive wheel, the replacement control described in (1) is performed when the replacement condition is satisfied and the ratio between a drive wheel braking force, which is the sum of the friction braking force and the regenerative braking force applied to the drive wheel, and a non-drive wheel braking force, which is the friction braking force applied to the non-drive wheel (also referred to as the driven wheel), is not equal to a target braking force distribution ratio.

For example, the set relationship being satisfied between the front wheel friction braking force and the rear wheel friction braking force means that the ratio between the front wheel friction braking force and the rear wheel friction braking force is equal to a set ratio, and one of the front wheel friction braking force and the rear wheel friction braking forces is larger than the other. For example, the set relationship being satisfied between the increase gradient of the front wheel friction braking force and the increase gradient of the rear wheel friction braking force means that the ratio between the increase gradient of the front wheel friction braking force and the increase gradient of the rear wheel friction braking force is a set gradient ratio, and the increase gradient of one of the front wheel friction braking force and the rear wheel friction braking force is larger than the increase gradient of the other. The set ratio and the set gradient ratio can be set to 1, but may be set to a value other than 1 (a value larger than 0 and smaller than 1 or a value larger than 1). The set relationship (the set ratio, the set gradient ratio, etc.) may be the same (constant values) during the entire process of the replacement control or may be determined each time (values that are determined each time).

(2) The brake system according to (1), wherein the regenerative braking force control unit includes a target regenerative braking force obtaining unit configured to obtain the target regenerative braking force based on a state including at least one of a traveling state of the vehicle and a state of the battery connected to the electric motor as the state of the vehicle. For example, the traveling state of the vehicle can be represented by the traveling speed of the vehicle, and the state of the battery can be represented by the state of charge of the battery, the temperature of the battery, etc.

(3) The brake system according to (1) or (2), wherein the replacement control unit is configured to increase the front wheel friction braking force and the rear wheel friction braking force so that a ratio of the rear wheel friction braking force to the front wheel friction braking force at the time the replacement control is finished becomes closer to a target braking force distribution ratio. Target braking force distribution refers to distribution of the braking force to the front and rear wheels at the target braking force distribution ratio in the case where the replacement control is performed in the present embodiment. The target braking force distribution ratio refers to a target value of the distribution ratio of the braking force applied to the rear wheel to the braking force applied to the front wheel in the replacement control. The target braking force distribution ratio may be an ideal braking force distribution ratio, an actual braking force distribution ratio, etc. The ideal braking force distribution ratio is the ratio of the rear wheel braking force to the front wheel braking force at the time the front and rear wheels are locked at the same time. The actual braking force distribution ratio is the ratio of the rear wheel friction braking force to the front wheel friction braking force in the case where the pressing force (e.g., the hydraulic pressure) is the same between the friction brake for the front wheel and the friction brake for the rear wheel when the regenerative braking force is not applied. However, the target braking force distribution ratio is not limited to the ideal braking force distribution ratio and the actual braking force distribution ratio, but may be determined as appropriate in the replacement control. The braking force that is applied to the rear wheel at the actual braking force distribution ratio tends to be smaller than the braking force that is applied to the rear wheel at the ideal braking force distribution ratio. The target braking force distribution ratio may be set to a value smaller than 1 (in the case where the braking force applied to the front wheel is larger than that applied to the rear wheel). For example, the target braking force distribution ratio may be used as the ratio of the rear wheel braking force to the front wheel braking force, or may be used as the ratio of the rear wheel friction braking force to the front wheel friction braking force.

(4) The brake system according to any one of (1) to (3), wherein the replacement control unit is configured to increase the front wheel friction braking force and the rear wheel friction braking force so that the ratio of the rear wheel friction braking force to the front wheel friction braking force (the rear wheel friction braking force/the front wheel friction braking force) becomes equal to a set ratio that is larger than 0. For example, the set ratio may be the target braking force distribution ratio (the ratio when the front wheel friction braking force is larger than the rear wheel friction braking force), may be 1, or may be the ratio when the rear wheel friction braking force is larger than the front wheel friction braking force.

(5) The brake system according to (4), wherein the replacement control unit includes a set ratio obtaining unit configured to set the set ratio to a larger value when the required total braking force is large than when the required total braking force is small.

(6) The brake system according to (5), wherein the set ratio obtaining unit sets the set ratio to a value larger than 1 when the required total braking force is larger than a first set value, sets the set ratio to a target braking force distribution ratio when the required total braking force is smaller than a second set value smaller than the first set value, and sets the set ratio to 1 when the required total braking force is equal to or larger than the second value and equal to or smaller than the first set value. For example, the set ratio can be a value that can change with a change in required total braking force in the replacement control.

(7) The brake system according to any one of (1) to (6), wherein the replacement control unit is configured to increase the front wheel friction braking force and the rear wheel friction braking force so that a ratio of an increase gradient of the rear wheel friction braking force to an increase gradient of the front wheel friction braking force becomes equal to a set gradient ratio that is larger than 0. In the case where the required total braking force is constant and the front wheel friction braking force and the rear wheel friction braking force are increased with a decrease in regenerative braking force, the increase gradient of the front wheel friction braking force can be set to $\Delta Fe/(1+\beta)$ and the increase gradient of the rear wheel friction braking force can be set to $\Delta Fe*\beta/(1+\beta)$, where $\Delta Fe$ represents an absolute value of a decrease gradient of the regenerative braking force. $\beta$ represents a set gradient ratio, and for example, may be set to a value larger than 0 and smaller than 1, may be set to 1, or may be set to a value larger than 1. In the brake system according to (7), both of the front wheel friction braking force and the rear wheel friction braking force always increase with a decrease in regenerative braking force.

(8) The brake system according to any one of (1) to (7), wherein the replacement control unit is configured to increase one of the front wheel friction braking force and the rear wheel friction braking force, which is applied to a non-drive wheel, without increasing the regenerative braking force when the required total braking force is increased.

(9) The brake system according to any one of (1) to (8), wherein the replacement control unit includes a drive wheel replacement control unit that replaces the regenerative braking force with the friction braking force for the drive wheel when a ratio between a drive wheel braking force and a non-drive wheel braking force becomes equal to a target braking force distribution ratio during the replacement control, the driving wheel braking force being a braking force including a friction braking force and a regenerative braking force which are applied to a drive wheel, the non-drive wheel braking force being a friction braking force that is applied to a non-drive wheel, the drive wheel being one of the front wheel and the rear wheel, and the non-drive wheel being the other wheel.

(10) The brake system according to any one of (1) to (9), wherein the replacement control unit is a first replacement control unit configured to perform the replacement control when the replacement condition is satisfied for the first time and a ratio between a drive wheel braking force and a non-drive wheel braking force is not equal to a target braking force distribution ratio, the driving wheel braking force being a braking force including a friction braking force and a regenerative braking force which are applied to a drive wheel, the non-drive wheel braking force being a friction braking force that is applied to a non-drive wheel, the drive wheel being one of the front wheel and the rear wheel, and the non-drive wheel being the other wheel, and the regenerative cooperative control unit includes a second replacement unit configured to replace the regenerative braking force applied to the drive wheel with the friction braking force when the replacement condition is satisfied for the first time and the ratio between the drive wheel braking force and the non-drive wheel braking force is equal to the target braking force distribution ratio. The drive wheel may be either the front wheel or the rear wheel. The ratio between the drive wheel braking force and the non-drive wheel braking force refers to the ratio of the rear wheel braking force out of the drive wheel braking force and the non-drive wheel braking force to the front wheel braking force out of the drive wheel braking force and the non-drive wheel braking force.

(11) The brake system according to any one of claims (1) to (10), wherein the replacement control unit is the first replacement control unit configured to perform the replacement control when the ratio between the drive wheel braking force and the non-drive wheel braking force is not equal to the target braking force distribution ratio, the driving wheel braking force being the braking force including the friction braking force and the regenerative braking force which are applied to the drive wheel, the non-drive wheel braking force being the friction braking force that is applied to the non-drive wheel, the drive wheel being one of the front wheel and the rear wheel, and the non-drive wheel being the other wheel, and the regenerative cooperative control unit includes a third replacement unit configured to replace the regenerative braking force with the friction braking force for at least one of the front wheel and the rear wheel when a ratio between a front wheel braking force and a rear wheel braking force is equal to a target braking force distribution ratio, the front wheel braking force being a braking force including at least one of the friction braking force and the regenerative braking force which are applied to the front wheel, and the rear wheel braking force being a braking force including at least one of the friction braking force and the regenerative braking force which are applied to the rear wheel.

What is claimed is:

1. A brake system, comprising:
a friction brake mechanism including
(a) a front wheel friction brake that is a friction brake provided for a front wheel of a vehicle,
(b) a rear wheel friction brake that is a friction brake provided for a rear wheel of the vehicle,
(c) a front wheel friction braking force control device configured to control a front wheel friction braking force applied to the front wheel by the front wheel friction brake, and
(d) a rear wheel friction braking force control device configured to control a rear wheel friction braking force applied to the rear wheel by the rear wheel friction brake;
a regenerative brake mechanism configured to apply a regenerative braking force to a drive wheel of the vehicle by regenerative braking of an electric motor that drives and rotates the drive wheel, and configured to control the regenerative braking force; and
an electronic control unit configured to
obtain, as a target regenerative braking force, a maximum regenerative braking force that can be output within a range that is not larger than a required total braking force, and control the regenerative brake mechanism based on the target regenerative braking force to control the regenerative braking force applied to the drive wheel, the required total braking force being a braking force required for the vehicle, and the maximum regenerative braking force being determined by a state of the vehicle,
control the front wheel friction braking force control device and the rear wheel friction braking force control device such that the required total braking force, which is the braking force required for the vehicle, is satisfied by one or more of the regenerative braking force, the front wheel friction braking force, and the rear wheel friction braking force,
perform replacement control when a predetermined replacement condition is satisfied, the replacement control being control in which a shortfall of the required total braking force, which is caused by a decrease in the regenerative braking force, is covered by increasing the front wheel friction braking force and the rear wheel friction braking force while satisfying a set relationship between the front wheel friction braking force and the rear wheel friction braking force or between an increase gradient of the front wheel friction braking force and an increase gradient of the rear wheel friction braking force, whereby a state in which the regenerative braking force is applied to the vehicle is replaced with a state in which the front wheel friction braking force and the rear wheel friction braking force are applied to the vehicle with no regenerative braking force applied to the vehicle,
set a set ratio of a target rear wheel friction braking force to a target front wheel friction braking force to a target braking force distribution ratio when the required total braking force is smaller than a first set value;
set the set ratio to a value larger than 1 when the required total braking force is larger than a second set value, wherein the second set value is larger than the first set value; and
set the set ratio to 1 when the required total braking force is equal to or larger than the first set value and equal to or smaller than the second set value.

2. The brake system according to claim 1, wherein the electronic control unit is configured to obtain the target regenerative braking force based on at least one of a traveling state of the vehicle and a state of a battery connected to the electric motor as the state of the vehicle.

3. The brake system according to claim 1, wherein the electronic control unit is configured to increase the front wheel friction braking force and the rear wheel friction braking force such that a ratio of the rear wheel friction braking force to the front wheel friction braking force at a time the replacement control is finished becomes closer to the target braking force distribution ratio.

4. The brake system according to claim 1, wherein the electronic control unit is configured to increase the front wheel friction braking force and the rear wheel friction braking force such that a ratio of the rear wheel friction braking force to the front wheel friction braking force becomes equal to a set ratio that is larger than 0.

5. The brake system according to claim 1, wherein the electronic control unit is configured to increase the front wheel friction braking force and the rear wheel friction braking force such that a ratio of an increase gradient of the rear wheel friction braking force to an increase gradient of the front wheel friction braking force becomes equal to a set gradient ratio that is larger than 0.

6. The brake system according to claim 1, wherein the electronic control unit is configured to increase one of the front wheel friction braking force and the rear wheel friction braking force, which is applied to a non-drive wheel, without increasing the regenerative braking force when the required total braking force is increased.

7. The brake system according to claim 1, wherein the electronic control unit is configured to perform the replacement control when the predetermined replacement condition is satisfied for a first time at a start of the replacement control and a ratio between a drive wheel braking force and a non-drive wheel braking force is not equal to the target braking force distribution ratio, the drive wheel braking force being a braking force including a friction braking force and a regenerative braking force which are applied to the drive wheel, the non-drive wheel braking force being a friction braking force that is applied to a non-drive wheel, the drive wheel being one of the front wheel and the rear wheel, and the non-drive wheel being the other wheel, and
replace the regenerative braking force being applied to the drive wheel with the friction braking force when the predetermined replacement condition is satisfied for the first time at the start of the replacement control and the ratio between the drive wheel braking force and the non-drive wheel braking force is equal to the target braking force distribution ratio.

8. The brake system according to claim 1, wherein the electronic control unit is configured to replace the regenerative braking force with the friction braking force for the drive wheel when a ratio between a drive wheel braking force and a non-drive wheel braking force becomes equal to the target braking force distribution ratio during the replacement control, the drive wheel braking force being a braking force including a friction braking force and a regenerative braking force which are applied to the drive wheel, the non-drive wheel braking force being a friction braking force that is applied to a non-drive wheel, the drive wheel being one of the front wheel and the rear wheel, and the non-drive wheel being the other wheel.

9. The brake system according to claim 1, wherein the electronic control unit is configured to
- perform the replacement control when the ratio between a drive wheel braking force and a non-drive wheel braking force is not equal to the target braking force distribution ratio, the drive wheel braking force being the braking force including the friction braking force and the regenerative braking force which are applied to the drive wheel, the non-drive wheel braking force being the friction braking force that is applied to the non-drive wheel, the drive wheel being one of the front wheel and the rear wheel, and the non-drive wheel being the other wheel, and
- replace the regenerative braking force with the friction braking force for at least one of the front wheel and the rear wheel when a ratio between a front wheel braking force and a rear wheel braking force is equal to the target braking force distribution ratio, the front wheel braking force being a braking force including at least one of the friction braking force and the regenerative braking force which are applied to the front wheel, and the rear wheel braking force being a braking force including at least one of the friction braking force and the regenerative braking force which are applied to the rear wheel.

* * * * *